US008137179B2

(12) United States Patent
Jensen et al.

(10) Patent No.: US 8,137,179 B2
(45) Date of Patent: Mar. 20, 2012

(54) GAMING DEVICE HAVING EXPANDING AND ROLLING WILD SYMBOLS

(75) Inventors: Janna B. Jensen, Reno, NV (US); Kurt Larsen, Reno, NV (US); Ryan William Cuddy, Reno, NV (US)

(73) Assignee: IGT, Reno, NV (US)

( * ) Notice: Subject to any disclaimer, the term of this patent is extended or adjusted under 35 U.S.C. 154(b) by 1193 days.

(21) Appl. No.: 11/557,865

(22) Filed: Nov. 8, 2006

(65) Prior Publication Data

US 2008/0108411 A1 May 8, 2008

(51) Int. Cl.
*A63F 13/00* (2006.01)
(52) U.S. Cl. ........................................... 463/20; 463/16
(58) Field of Classification Search .................... 463/16, 463/20, 25
See application file for complete search history.

(56) References Cited

U.S. PATENT DOCUMENTS 1,978,395 A 10/1934 Groetchen
2,545,644 A 3/1951 Benton et al.
2,692,074 A 10/1954 Mueller et al.
3,420,525 A 1/1969 Waders
3,642,287 A 2/1972 Lally et al.
3,667,757 A 6/1972 Holmberg
3,735,987 A 5/1973 Ohki
3,889,444 A 6/1975 Davis et al.
4,198,052 A 4/1980 Gauselmann
4,258,838 A 3/1981 Rockola et al.
4,410,178 A 10/1983 Partiridge
4,448,419 A 5/1984 Telnaes
4,513,970 A 4/1985 Opresco et al.
4,560,161 A 12/1985 Hamano (Continued)

FOREIGN PATENT DOCUMENTS

AU B-74936/87 6/1987

(Continued)

OTHER PUBLICATIONS

3-Way Action Poker Brochure and Article written by IGT, published in 2002, in or before December thereof.

(Continued)

*Primary Examiner* — Peter DungBa Vo
*Assistant Examiner* — Damon Pierce
(74) *Attorney, Agent, or Firm* — K&L Gates LLP

(57) ABSTRACT

The gaming device and method disclosed herein have a plurality of reels and at least one expanding and roaming wild symbol or wild symbol set. The wild symbol or wild symbol set moves relative to the reels to provide a player with additional opportunities to win an award. When the wild symbol appears on one of the reels and a designated trigger symbol also appears on one of the reels, the wild symbol expands to form an expanded wild symbol set that includes a plurality of individual wild symbols. The designated trigger symbol is associated with or determines the number of rolls (i.e., the number of times the expanded wild symbol set will roll or move across the reels). For each roll, the expanded wild symbol set rolls (left to right or right to left) to one of the reels. That is, the expanded wild symbol set enables a plurality of individual wild symbols to randomly move or roam from reel to reel for a number of rolls or moves, wherein the number is determined based on the designated trigger symbol. After each move, the gaming device performs an award evaluation to determine whether a winning combination is displayed on the reels. In one embodiment, the designated trigger symbol becomes an individual wild symbol.

48 Claims, 14 Drawing Sheets

U.S. PATENT DOCUMENTS 4,582,324 A 4/1986 Koza et al.
4,586,713 A 5/1986 Abu-Shumays et al.
4,618,150 A 10/1986 Kimura
4,624,459 A 11/1986 Kaufman
4,648,600 A 3/1987 Olliges
4,695,053 A 9/1987 Vazquez, Jr. et al.
4,706,956 A 11/1987 Abu-Shumays et al.
4,722,527 A 2/1988 Gauselmann
4,743,022 A 5/1988 Wood
4,756,531 A 7/1988 DiRe et al.
4,805,907 A 2/1989 Haiwara
4,817,952 A 4/1989 Biro et al.
4,823,538 A 4/1989 Takamura
4,836,546 A 6/1989 DiRe et al.
4,836,553 A 6/1989 Suttle et al.
4,838,552 A 6/1989 Hagiwara
4,844,467 A 7/1989 Gyenge et al.
4,861,041 A 8/1989 Jones et al.
4,871,171 A 10/1989 Rivero
4,874,173 A 10/1989 Kishishita
4,889,340 A 12/1989 Greene
4,991,848 A 2/1991 Greenwood et al.
5,019,973 A 5/1991 Wilcox et al.
5,033,744 A 7/1991 Bridgeman et al.
5,042,818 A 8/1991 Weingardt
5,067,712 A 11/1991 Georgilas
5,078,405 A 1/1992 Jones et al.
5,085,435 A 2/1992 Rossides
5,085,436 A 2/1992 Bennett
5,092,598 A 3/1992 Kamille
5,098,107 A 3/1992 Boylan et al.
5,102,134 A 4/1992 Smyth
5,102,137 A 4/1992 Ekiert
5,152,529 A 10/1992 Okada
5,154,429 A 10/1992 LeVasseur
5,167,413 A 12/1992 Fulton
5,178,390 A 1/1993 Okada
5,205,555 A 4/1993 Hamano
5,209,479 A 5/1993 Nagao et al.
5,211,399 A 5/1993 Howard
5,224,706 A 7/1993 Bridgeman et al.
5,249,800 A 10/1993 Hilgendorf et al.
5,257,784 A 11/1993 Boylan et al.
5,259,616 A 11/1993 Bergmann
5,282,633 A 2/1994 Boylan et al.
5,288,077 A 2/1994 Jones
5,288,081 A 2/1994 Breeding
5,308,065 A 5/1994 Bridgeman et al.
5,332,219 A 7/1994 Marnell, II et al.
5,332,228 A 7/1994 Schultz
5,342,047 A 8/1994 Heidel et al.
5,342,049 A 8/1994 Wichinsky et al.
5,362,052 A 11/1994 Kubatsch
5,364,100 A 11/1994 Ludlow et al.
5,364,105 A 11/1994 Jones
5,373,440 A 12/1994 Cohen et al.
5,377,973 A 1/1995 Jones et al.
5,393,057 A 2/1995 Marnell, II
5,393,061 A 2/1995 Manship et al.
5,395,111 A 3/1995 Inoue
5,407,200 A 4/1995 Zalabak
5,423,539 A 6/1995 Nagao
5,429,507 A 7/1995 Kaplan
5,431,407 A 7/1995 Hofberg et al.
5,431,408 A 7/1995 Adams
5,437,462 A 8/1995 Breeding
5,449,173 A 9/1995 Thomas et al.
5,452,899 A 9/1995 Skratulia et al.
5,456,465 A 10/1995 Durham
5,489,101 A 2/1996 Moody
5,490,670 A 2/1996 Hobert
5,494,287 A 2/1996 Manz
5,511,781 A 4/1996 Wood et al.
5,524,888 A 6/1996 Heidel
5,529,309 A 6/1996 Bartlett
5,531,440 A 7/1996 Dabrowski et al.
5,531,441 A 7/1996 Dabrowski et al.
5,536,016 A 7/1996 Thompson
5,542,669 A 8/1996 Charron et al.
5,560,603 A 10/1996 Seelig et al.
5,569,084 A 10/1996 Nicastro et al.
5,577,731 A 11/1996 Jones
5,580,311 A 12/1996 Haste, III
5,584,485 A 12/1996 Jones et al.
5,584,764 A 12/1996 Inoue
5,607,162 A 3/1997 Boylan et al.
5,611,535 A 3/1997 Tiberio
5,620,182 A 4/1997 Rossides
5,626,341 A 5/1997 Jones et al.
5,642,882 A 7/1997 Guerzini
5,642,884 A 7/1997 Pitcher
5,647,798 A 7/1997 Falciglia
5,655,965 A 8/1997 Takemoto et al.
5,660,391 A 8/1997 Klasee
5,660,393 A 8/1997 Dreger
5,664,781 A 9/1997 Feola
5,711,525 A 1/1998 Breeding
5,720,662 A 2/1998 Holmes, Jr. et al.
D392,340 S 3/1998 DeSimone
5,722,891 A 3/1998 Inoue
5,732,948 A 3/1998 Yoseloff
5,743,524 A 4/1998 Nannicola
5,749,784 A 5/1998 Clapper, Jr.
5,752,881 A 5/1998 Inoue
5,762,552 A 6/1998 Vuong et al.
5,766,074 A 6/1998 Cannon et al.
5,769,716 A 6/1998 Saffari et al.
5,772,506 A 6/1998 Marks et al.
5,772,509 A 6/1998 Weiss
5,775,692 A 7/1998 Watts et al.
5,788,573 A 8/1998 Baerlocher et al.
5,794,964 A 8/1998 Jones et al.
5,795,225 A 8/1998 Jones et al.
5,807,172 A 9/1998 Piechowiak
5,810,361 A 9/1998 Kadlic
5,816,915 A 10/1998 Kadlic
5,816,918 A 10/1998 Kelly et al.
5,823,534 A 10/1998 Banyai
5,823,873 A 10/1998 Moody
5,823,874 A 10/1998 Adams
5,833,536 A 11/1998 Davids et al.
5,833,537 A 11/1998 Barrie
5,848,932 A 12/1998 Adams
5,851,148 A 12/1998 Brune et al.
5,855,514 A 1/1999 Kamille
5,863,041 A 1/1999 Boylan et al.
5,868,618 A 2/1999 Netley et al.
5,868,619 A 2/1999 Wood et al.
5,873,781 A 2/1999 Keane
5,882,259 A 3/1999 Holmes, Jr. et al.
5,882,261 A 3/1999 Adams
5,885,157 A 3/1999 Harada et al.
5,890,962 A 4/1999 Takemoto
5,911,418 A 6/1999 Adams
5,918,880 A 7/1999 Voigt, IV et al.
5,919,088 A 7/1999 Weiss
5,927,714 A 7/1999 Kaplan
5,934,672 A 8/1999 Sines et al.
5,935,002 A 8/1999 Falciglia
5,944,315 A 8/1999 Mostashari
5,947,820 A 9/1999 Morro et al.
5,947,821 A 9/1999 Stone
5,951,397 A 9/1999 Dickinson
5,953,127 A 9/1999 Washio et al.
5,964,463 A 10/1999 Moore, Jr.
5,967,894 A 10/1999 Kinoshita et al.
5,971,849 A 10/1999 Falciglia
5,980,384 A 11/1999 Barrie
5,984,781 A 11/1999 Sunaga
5,988,638 A 11/1999 Rodesch et al.
5,996,997 A 12/1999 Kamille
5,997,400 A 12/1999 Seelig et al.
5,997,401 A 12/1999 Crawford
6,003,867 A 12/1999 Rodesch et al.
6,004,207 A 12/1999 Wilson, Jr. et al.
6,007,066 A 12/1999 Moody
6,012,982 A 1/2000 Piechowiak et al.

6,015,344 A 1/2000 Kelly et al.
6,015,346 A 1/2000 Bennett
6,019,369 A 2/2000 Nakagawa et al.
6,033,307 A 3/2000 Vancura
6,056,289 A 5/2000 Clapper, Jr.
6,056,642 A 5/2000 Bennett
6,059,289 A 5/2000 Vancura
6,059,658 A 5/2000 Mangano et al.
6,062,978 A 5/2000 Martino et al.
6,062,980 A 5/2000 Luciano
6,068,552 A 5/2000 Walker et al.
6,086,066 A 7/2000 Takeuchi et al.
6,089,976 A 7/2000 Schneider et al.
6,089,977 A 7/2000 Bennett
6,089,978 A 7/2000 Adams
6,093,102 A 7/2000 Bennett
6,095,921 A 8/2000 Walker et al.
6,102,400 A 8/2000 Scott et al.
6,102,798 A 8/2000 Bennett
6,117,009 A 9/2000 Yoseloff
6,120,031 A 9/2000 Adams
6,120,377 A 9/2000 McGinnis, Sr. et al.
6,120,378 A 9/2000 Moody
6,126,541 A 10/2000 Fuchs
6,126,542 A 10/2000 Fier
6,135,885 A 10/2000 Lermusiaux
6,142,872 A 11/2000 Walker et al.
6,142,873 A 11/2000 Weiss et al.
6,142,874 A 11/2000 Kodachi et al.
6,142,875 A 11/2000 Kodachi et al.
6,146,273 A 11/2000 Olsen
6,149,156 A 11/2000 Feola
6,149,521 A 11/2000 Sandusky
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,165,070 A 12/2000 Nolte et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,179,711 B1 1/2001 Yoseloff
6,186,894 B1 2/2001 Mayeroff
6,190,254 B1 2/2001 Bennett
6,190,255 B1 2/2001 Thomas et al.
6,200,217 B1 3/2001 Osawa
6,203,409 B1 3/2001 Kennedy et al.
6,203,428 B1 3/2001 Giobbi et al.
6,203,429 B1 3/2001 Demar et al.
6,210,279 B1 4/2001 Dickinson
6,213,875 B1 4/2001 Suzuki
6,213,876 B1 4/2001 Moore, Jr.
6,220,959 B1 4/2001 Homes, Jr. et al.
6,224,483 B1 5/2001 Mayeroff
6,224,484 B1 5/2001 Okuda et al.
6,227,970 B1 5/2001 Shimizu et al.
6,231,442 B1 5/2001 Mayeroff
6,231,445 B1 5/2001 Acres
6,234,897 B1 5/2001 Frohm et al.
6,238,287 B1 5/2001 Komori et al.
6,238,288 B1 5/2001 Walker et al.
6,241,607 B1 6/2001 Payne et al.
6,251,013 B1 6/2001 Bennett
D445,841 S 7/2001 Sabo
6,261,177 B1 7/2001 Bennett
6,270,408 B1 8/2001 Sakamoto
6,270,409 B1 8/2001 Shuster
6,270,411 B1 8/2001 Gura et al.
6,270,412 B1 8/2001 Crawford et al.
6,287,194 B1 9/2001 Okada et al.
6,290,600 B1 9/2001 Glasson
6,296,568 B1 10/2001 Tracy
6,299,165 B1 10/2001 Nagano
6,299,170 B1 10/2001 Yoseloff
6,302,398 B1 10/2001 Vecchio
6,302,790 B1 10/2001 Brossard
6,305,686 B1 10/2001 Perrie et al.
6,309,300 B1 10/2001 Glavich
6,311,976 B1 11/2001 Yoseloff et al.
6,312,334 B1 11/2001 Yoseloff
6,315,660 B1 11/2001 DeMar et al.
6,315,663 B1 11/2001 Sakamoto
6,315,664 B1 11/2001 Baerlocher
6,319,124 B1 11/2001 Baerlocher et al.
6,322,078 B1 11/2001 Adams
6,322,309 B1 11/2001 Thomas et al.
6,328,649 B1 12/2001 Randall et al.
6,334,814 B1 1/2002 Adams
6,336,860 B1 1/2002 Webb
6,336,863 B1 1/2002 Baerlocher et al.
6,340,158 B2 1/2002 Pierce et al.
6,346,043 B1 2/2002 Colin et al.
6,347,996 B1 2/2002 Gilmore et al.
6,358,144 B1 3/2002 Kaddlic et al.
6,358,147 B1 3/2002 Jaffe et al.
6,364,766 B1 4/2002 Anderson et al.
6,364,768 B1 4/2002 Acres et al.
6,375,187 B1 4/2002 Baerlocher
6,375,570 B1 4/2002 Poole
6,394,902 B1 5/2002 Glavich et al.
D458,311 S 6/2002 Seelig et al.
6,398,218 B1 6/2002 Vancura
6,398,220 B1 6/2002 Inoue
6,398,644 B1 6/2002 Perrie et al.
6,406,369 B1 6/2002 Baerlocher et al.
6,409,602 B1 6/2002 Wiltshire et al.
6,413,160 B1 7/2002 Vancura
6,413,161 B1 7/2002 Baerlocher et al.
6,413,162 B1 7/2002 Baerlocher et al.
6,416,408 B2 7/2002 Tracy et al.
6,419,579 B1 7/2002 Bennett
6,425,824 B1 7/2002 Baerlocher et al.
6,428,412 B1 8/2002 Anderson et al.
6,431,548 B1 8/2002 Voigt, IV et al.
6,435,511 B1 8/2002 Vancura et al.
6,439,943 B1 8/2002 Aoki et al.
6,439,993 B1 8/2002 O'Halloran
6,439,995 B1 8/2002 Hughs-Baird et al.
D463,504 S 9/2002 Stephan
6,443,452 B1 9/2002 Brune
6,443,837 B1 9/2002 Jaffe et al.
6,454,266 B1 9/2002 Breeding et al.
6,454,651 B1 9/2002 Yoseloff
6,461,241 B1 10/2002 Webb et al.
6,464,582 B1 10/2002 Baerlocher et al.
6,468,156 B1 10/2002 Hughs-Baird et al.
6,471,208 B2 10/2002 Yoseloff et al.
6,481,713 B2 11/2002 Perrie et al.
6,491,584 B2 12/2002 Graham et al.
6,494,454 B2 12/2002 Adams
6,494,785 B1 12/2002 Gerrard et al.
6,506,114 B1 1/2003 Estes et al.
6,506,118 B1 1/2003 Baerlocher et al.
6,511,375 B1 1/2003 Kaminkow
6,514,141 B1 2/2003 Kaminkow et al.
6,517,432 B1 2/2003 Jaffe
6,517,433 B2 2/2003 Loose et al.
6,537,150 B1 3/2003 Luciano et al.
6,537,152 B2 3/2003 Seelig et al.
6,551,187 B1 4/2003 Jaffe
6,554,703 B1 4/2003 Bussick et al.
6,554,704 B2 4/2003 Nicastro et al.
6,558,253 B1 5/2003 DeSimone et al.
6,558,254 B2 5/2003 Baelocher et al.
6,561,904 B2 5/2003 Locke et al.
6,565,433 B1 5/2003 Baerlocher et al.
6,565,436 B1 5/2003 Baerlocher
6,569,015 B1 5/2003 Baerlocher et al.
6,569,016 B1 5/2003 Baerlocher
6,572,471 B1 6/2003 Bennett
6,572,473 B1 6/2003 Baerlocher
6,575,830 B2 6/2003 Baerlocher et al.
6,585,591 B1 7/2003 Baerlocher et al.
6,589,114 B2 7/2003 Rose

| | | | | |
|---|---|---|---|---|
| 6,592,457 | B1 | 7/2003 | Frohm et al. | |
| 6,595,854 | B2 | 7/2003 | Hughs-Baird et al. | |
| 6,599,185 | B1 | 7/2003 | Kaminkow et al. | |
| 6,599,192 | B1 | 7/2003 | Baerlocher et al. | |
| 6,602,137 | B2 | 8/2003 | Kaminkow et al. | |
| 6,604,740 | B1 | 8/2003 | Singer et al. | |
| 6,605,002 | B2 | 8/2003 | Baerlocher | |
| 6,607,437 | B2 | 8/2003 | Casey et al. | |
| 6,607,438 | B2 | 8/2003 | Baerlocher et al. | |
| 6,609,974 | B2 | 8/2003 | Mead et al. | |
| 6,616,142 | B2 | 9/2003 | Adams | |
| 6,632,139 | B1 | 10/2003 | Baerlocher | |
| 6,632,140 | B2 | 10/2003 | Berman et al. | |
| 6,632,141 | B2 | 10/2003 | Webb et al. | |
| 6,634,941 | B2 | 10/2003 | Olive | |
| 6,634,943 | B1 | 10/2003 | Baerlocher | |
| 6,634,945 | B2 | 10/2003 | Glavich et al. | |
| 6,638,164 | B2 | 10/2003 | Randall et al. | |
| 6,644,663 | B2 | 11/2003 | Seelig et al. | |
| 6,644,664 | B2 | 11/2003 | Muir et al. | |
| 6,659,864 | B2 | 12/2003 | McGahn et al. | |
| 6,676,512 | B2 | 1/2004 | Fong et al. | |
| 6,712,694 | B1 | 3/2004 | Nordman | |
| 6,719,630 | B1 | 4/2004 | Seelig et al. | |
| 6,726,204 | B2 | 4/2004 | Inoue | |
| 6,729,621 | B2 | 5/2004 | Moody | |
| 6,733,389 | B2 | 5/2004 | Webb et al. | |
| 6,746,329 | B1 | 6/2004 | Duhamel | |
| 6,761,632 | B2 | 7/2004 | Bansemer et al. | |
| 6,780,109 | B2 | 8/2004 | Kaminkow | |
| 6,786,818 | B1 | 9/2004 | Rothschild et al. | |
| 6,796,903 | B1 | 9/2004 | Bryant | |
| 6,805,349 | B2 | 10/2004 | Baerlocher et al. | |
| 6,805,632 | B2 | 10/2004 | Suda | |
| 6,808,454 | B2 | 10/2004 | Gerrard et al. | |
| 6,855,056 | B2 | 2/2005 | Inoue | |
| 6,866,583 | B2 | 3/2005 | Glavich et al. | |
| 6,869,360 | B2 | 3/2005 | Marks et al. | |
| D504,473 | S | 4/2005 | Baerlocher | |
| 6,880,826 | B2 | 4/2005 | Inoue | |
| 6,893,018 | B2 | 5/2005 | Inoue | |
| 6,905,406 | B2 | 6/2005 | Kaminkow et al. | |
| 6,913,532 | B2 | 7/2005 | Baerlocher et al. | |
| 6,921,335 | B2 | 7/2005 | Rodgers et al. | |
| 6,932,700 | B2 | 8/2005 | Bennett et al. | |
| 6,955,600 | B2 | 10/2005 | Glavich et al. | |
| 6,960,133 | B1 | 11/2005 | Marks et al. | |
| 7,001,274 | B2 | 2/2006 | Baerlocher et al. | |
| 7,014,560 | B2 | 3/2006 | Glavich et al. | |
| 7,056,213 | B2 | 6/2006 | Ching et al. | |
| 7,070,502 | B1 * | 7/2006 | Bussick et al. | 463/20 |
| 7,074,127 | B2 | 7/2006 | Cuddy et al. | |
| 7,090,580 | B2 | 8/2006 | Rodgers et al. | |
| 7,094,148 | B2 | 8/2006 | Baerlocher et al. | |
| 2001/0009865 | A1 | 7/2001 | Demar et al. | |
| 2001/0019965 | A1 | 9/2001 | Ochi | |
| 2002/0010017 | A1 | 1/2002 | Bennett | |
| 2002/0025844 | A1 | 2/2002 | Casey et al. | |
| 2002/0045475 | A1 | 4/2002 | Glavich et al. | |
| 2002/0072402 | A1 | 6/2002 | Baerlocher | |
| 2002/0094857 | A1 | 7/2002 | Meyer | |
| 2002/0142822 | A1 | 10/2002 | Baerlocher et al. | |
| 2002/0151350 | A1 | 10/2002 | Baerlocher et al. | |
| 2002/0155883 | A1 | 10/2002 | Baerlocher | |
| 2002/0193160 | A1 | 12/2002 | Tarantino | |
| 2003/0013514 | A1 | 1/2003 | Cregan et al. | |
| 2003/0040355 | A1 | 2/2003 | Baerlocher | |
| 2003/0045344 | A1 | 3/2003 | Webb et al. | |
| 2003/0045348 | A1 | 3/2003 | Palmer et al. | |
| 2003/0045354 | A1 | 3/2003 | Giobbi | |
| 2003/0054875 | A1 | 3/2003 | Marks et al. | |
| 2003/0060267 | A1 | 3/2003 | Glavich et al. | |
| 2003/0060272 | A1 | 3/2003 | Glavich et al. | |
| 2003/0064768 | A1 | 4/2003 | Fier | |
| 2003/0064795 | A1 | 4/2003 | Baerlocher et al. | |
| 2003/0064802 | A1 | 4/2003 | Rodgers | |
| 2003/0069062 | A1 | 4/2003 | Shimizu | |
| 2003/0073483 | A1 | 4/2003 | Glavich et al. | |
| 2003/0162585 | A1 | 8/2003 | Bigelow et al. | |
| 2003/0203752 | A1 | 10/2003 | Kaminkow et al. | |
| 2003/0203753 | A1 | 10/2003 | Muir et al. | |
| 2003/0216165 | A1 | 11/2003 | Singer et al. | |
| 2004/0002372 | A1 | 1/2004 | Rodgers et al. | |
| 2004/0009803 | A1 | 1/2004 | Bennett et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0018866 | A1 | 1/2004 | Inoue | |
| 2004/0026854 | A1 | 2/2004 | Inoue | |
| 2004/0033827 | A1 | 2/2004 | Gilmore et al. | |
| 2004/0036218 | A1 | 2/2004 | Inoue | |
| 2004/0038726 | A1 | 2/2004 | Inoue | |
| 2004/0038731 | A1 | 2/2004 | Englman | |
| 2004/0048650 | A1 | 3/2004 | Mierau et al. | |
| 2004/0048652 | A1 | 3/2004 | Ching et al. | |
| 2004/0053666 | A1 | 3/2004 | Vancura | |
| 2004/0053669 | A1 | 3/2004 | Gerrard et al. | |
| 2004/0053672 | A1 | 3/2004 | Baerlocher | |
| 2004/0053676 | A1 | 3/2004 | Rodgers | |
| 2004/0072612 | A1 | 4/2004 | Rodgers et al. | |
| 2004/0137982 | A1 | 7/2004 | Cuddy et al. | |
| 2004/0147306 | A1 | 7/2004 | Randall et al. | |
| 2004/0155399 | A1 | 8/2004 | Inoue | |
| 2004/0183251 | A1 | 9/2004 | Inoue | |
| 2004/0192431 | A1 | 9/2004 | Singer et al. | |
| 2004/0195773 | A1 | 10/2004 | Masci et al. | |
| 2004/0242313 | A1 | 12/2004 | Munoz | |
| 2004/0266516 | A1 | 12/2004 | Thomas | |
| 2004/0266517 | A1 | 12/2004 | Bleich et al. | |
| 2005/0020344 | A1 | 1/2005 | Kaminkow | |
| 2005/0043083 | A1 | 2/2005 | Inoue | |
| 2005/0043084 | A1 | 2/2005 | Inoue | |
| 2005/0049035 | A1 | 3/2005 | Baerlocher et al. | |
| 2005/0059478 | A1 | 3/2005 | Peterson et al. | |
| 2005/0064924 | A1 | 3/2005 | Glavich | |
| 2005/0070354 | A1 | 3/2005 | Baerlocher et al. | |
| 2005/0075163 | A1 | 4/2005 | Cuddy et al. | |
| 2005/0104298 | A1 | 5/2005 | Butcher et al. | |
| 2005/0233801 | A1 | 10/2005 | Baerlocher et al. | |
| 2005/0266917 | A1 | 12/2005 | Glavich et al. | |
| 2005/0277460 | A1 | 12/2005 | Inoue | |
| 2006/0040728 | A1 | 2/2006 | Fuller | |
| 2006/0046830 | A1 | 3/2006 | Webb | |
| 2006/0068884 | A1 | 3/2006 | Baerlocher et al. | |
| 2006/0073876 | A1 | 4/2006 | Cuddy | |

FOREIGN PATENT DOCUMENTS

| | | | |
|---|---|---|---|
| AU | 1997 16432 | B2 | 9/1997 |
| AU | 199717601 | B2 | 9/1997 |
| AU | 1996 50327 | | 10/1997 |
| AU | 199747657 | B2 | 12/1997 |
| AU | B-43613/97 | | 2/1998 |
| AU | 1998 63553 | | 10/1998 |
| AU | 199917318 | A1 | 9/1999 |
| AU | 778685 | | 4/2005 |
| DE | 31 05 266 | | 9/1982 |
| DE | 3700861 | | 7/1988 |
| DE | 4014477 | | 7/1991 |
| EP | 0 060 019 | A1 | 9/1982 |
| EP | 0410789 | | 2/1990 |
| EP | 0737494 | | 12/1994 |
| EP | 0 688 002 | | 12/1995 |
| EP | 0 798 676 | | 10/1997 |
| EP | 0 874 337 | | 10/1998 |
| EP | 0 926 645 | | 6/1999 |
| EP | 0 944 030 | | 9/1999 |
| EP | 0 945 837 | | 9/1999 |
| EP | 0 981 119 | | 2/2000 |
| EP | 0 984 408 | A2 | 3/2000 |
| EP | 1039424 | | 3/2000 |
| EP | 1063622 | | 5/2000 |
| EP | 0 984 409 | | 8/2000 |
| EP | 1 184 822 | | 3/2002 |
| EP | 1 296 296 | A2 | 3/2003 |
| EP | 1 513 117 | | 3/2005 |
| GB | 869755 | | 6/1957 |
| GB | 1 298 681 | | 12/1972 |
| GB | 1 464 896 | | 2/1977 |

| | | | |
|---|---|---|---|
| GB | 2 066 991 | | 7/1981 |
| GB | 2 072 395 | | 9/1981 |
| GB | 2 083 936 | | 3/1982 |
| GB | 2 084 371 | | 4/1982 |
| GB | 2 092 797 | | 8/1982 |
| GB | 2 096 376 | | 10/1982 |
| GB | 2 097 160 | | 10/1982 |
| GB | 2 101 380 | A | 1/1983 |
| GB | 2 106 292 | | 4/1983 |
| GB | 2 117 155 | | 10/1983 |
| GB | 2 144 644 | | 3/1985 |
| GB | 2 170 636 | | 8/1986 |
| GB | 2 180 087 | | 3/1987 |
| GB | 2 181 589 | | 4/1987 |
| GB | 2 183 882 | | 6/1987 |
| GB | 2 193 827 | A | 2/1988 |
| GB | 2 201 821 | | 9/1988 |
| GB | 2 202 984 | | 10/1988 |
| GB | 2 222 712 | | 3/1990 |
| GB | 2 226 436 | | 6/1990 |
| GB | 2 253 300 | | 2/1992 |
| GB | 2 322 217 | | 8/1998 |
| GB | 2 328 311 | | 2/1999 |
| GB | 2 353 128 | | 2/2001 |
| JP | 63237970 | | 10/1988 |
| JP | 04323544 | | 11/1992 |
| JP | 05280967 | | 10/1993 |
| JP | 2000109267 | | 4/2000 |
| WO | WO 93/03464 | | 2/1993 |
| WO | WO 97/32285 | | 9/1997 |
| WO | WO 99/10849 | | 3/1999 |
| WO | WO 00/12186 | | 3/2000 |
| WO | WO 00/32286 | | 6/2000 |
| WO | WO 00/59591 | | 10/2000 |
| WO | WO 00/66235 | | 11/2000 |
| WO | WO 00/76606 | A1 | 12/2000 |
| WO | WO 01/26019 | | 4/2001 |
| WO | WO 2004/025584 | | 3/2004 |

OTHER PUBLICATIONS

50 Lions Advertisement, written by Aristocrat Leisure Industries, published in Sep. 2004.
The $1,000,000 Pyramid Advertisement, written by IGT, published in 2001, in or before December thereof.
The $1,000,000 Pyramid Advertisement, written by IGT, published prior to Oct. 1, 2004.
Andy Capp Article, written by Bally Gaming, published in Strictly Slots in Feb. 2002.
Andy Capp Hits the Bullseye as a New Evo Video Advertisement, written by Bally Gaming Systems, published in 2001, in or before December thereof.
Addams Family Advertisement and Article written by IGT, published in Strictly Slots in 2000, in or before December thereof.
Agassi Article written by Aristocrat Leisure Industries, published by Strictly Slots in Aug. 2005.
Amazing Wins Article, written by Bally Gaming Systems, published in Strictly Slots Aug. 2005.
American Thunder Screen Shots written by IGT, published in 1998, in or before December thereof.
A New Three of a Kind Article, published in Strictly Slots in Jan. 2005.
Asian Princess Article, written by Aristocrat Leisure Industries, published in Strictly Slots Mar. 2005.
Bally Slot Machines Electro-Mechanicals 1964-1980 Book, Revised 3rd Edition [in part] written by Marshall Fey.
Bally Live! Special Global Gaming Expo 2002 issue, written by Bally Gaming Systems, published in 2002, in or before December thereof.
Barn Yard Advertisement, written by Aristocrat, available prior to Nov. 2006.
Bewitched—The Nosey Neighbor Advertisement, written by AC Coin and Slot/Product Guide, published in 2006, in or before December thereof.
Big Bang Piggy Bankin Advertisement written by WMS Gaming, Inc., published prior to 2000, in or before December thereof.
Black Swan Paytable Display written by IGT, published prior to Dec. 2001.
Blues Brothers SNL Advertisement, written by Bally Gaming Systems, published in 2003, in or before December thereof.
Bonus Times written by Bally Gaming, published in 2000, in or before December thereof.
Boot Scootin Article written by Strictly Slots/Aristocrat Leisure Industries, PTY Ltd., published in Apr. 2001.
Break the Spell Advertisement written by Atronic Casino Technology, Ltd., published in 1999, on or before December thereof.
Break the Spell Article written by Strictly Slots/Atronic Casino Technology, Ltd., published in Sep. 2000.
Break the Spell Atronic Web Page, published in Jan. 2001.
Break the Spell Brochure, Article and Website page, Atronic Americas, LLC, Strictly Slots, published in 1999, 2000, printed on Jan. 15, 2001.
Break the Spell Brochure, published in 1999, on or before December thereof.
Bunco Night Advertisement written by IGT, published in 2000, in or before December thereof.
By George Advertisement, written by IGT, published in 2002, in or before December thereof.
Cash Box Advertisement and Article written by Anchor Games, published by Strictly Slots in 2000, in or before December thereof.
Cash Chameleon Article written by Strictly Slots/Aristocrat Leisure Industries, PTY Ltd., published in Apr. 2001.
Cash Crop Brochure written by Arist O Crat Leisure Industries, published in 1997, in or before December thereof.
Cast Aways Article, written by Atronic Casino Technology, Ltd., published in Strictly Slots in Dec. 2000.
Catch a Wave Advertisement written by IGT, published in Dec. 2000.
Chutes & Ladders Game Instructions, written by Hasbro-Milton Bradley, published in 1999, in or before December thereof.
Cleopatra Advertisement, published by GameQuest2002 prior to Oct. 1, 2004.
Cleopatra Article written by IGT, published in Strictly Slots in Sep. 2002.
Cleopatra Game Advertisement, [online] [printed on Mar. 21, 2001]. Retrieved from the Internet at <URL:http://www.igt.comgamesnew__games/cleopatra.html>.
Cleopatra iGame-Plus Series Advertisement, written by IGT, published in 2000, in or before December thereof.
Cleopatra Slots—5 Reel/9 Line Vision Series, written by IGT, published in 2004, in or before December thereof.
Cleopatra Slots 90-Coin Advertisement, published in HotNewGames prior to Oct. 1, 2004.
Cleopatra Slots Advertisement, written by IGT, published in Game News in 2003, in or before December thereof.
Cleopatra Slots S2000 Series Advertisement, written by IGT, published in 2002, in or before December thereof.
Cleopatra Slot Spotlight Article, written by IGT, published prior to Oct. 1, 2004.
Cleopatra Slots Vision Series Advertisement, written by IGT, published in 2003, in or before December thereof.
Cossack Dancer Advertisement written by Olympic Video Gaming, published prior to Jan. 2003.
Cuckoo Advertisement, written by Aristocrat, published prior to Oct. 1, 2004.
Cuckoo Aristocrat Brochure written by Aristocrat, published in Feb. 1998.
Dam Lumberjack Beavers Advertisement, written by IGT, published in 2004, in or before December thereof.
Dating Game IGT Slot Line Brochure, written by IGT, published in 2003, in or before December thereof.
Dating Game Article, written by IGT, published by Strictly Slots Aug. 2004.
Days Off Article, written by Konami, published in Strictly Slots in Feb. 2005.
Declaration of Josef Alexander Hartl, Mar. 1, 2001.
Declaration of Josef Alexander Hartl, Mar. 15, 2001.
Deep Blue Dollars Article, written by Atronic Casino Technology, Ltd., published in Jun. 2004.

Description of Symbol Feature in Australian UFO Gaming Machine written by Barcrest Ltd., published in 1995, on or before December thereof.
Dice Games Article describing Poker Dice, published prior to 2001, in or before December thereof.
Dolphin Treasure Advertisement, written by Aristocrat Leisure Industries Pty., Ltd., published in 1996, in or before December thereof.
Don't Settle for 2nd Class in Class II Advertisement, written by Sodak Gaming, published in 2004, in or before December thereof.
Double Diamond 2000, [online] [printed on Mar. 21, 2001]. Retrieved from the Internet at <URL:http://www.igt.com/games/new__games/dd2000.html>.
Double Diamond Line Advertisement written by Bally Gaming Systems, published in 2000, on or before December thereof.
Double Diamond Pennies Advertisement written by IGT, published in 2004, in or before December thereof.
Enchanted Forest Brochure, Aristocrat, Incorporated, published in 1995, in or before December thereof.
Enchanted Forest™ Gaming Description from Aristocrat, available in 1994, on or before December thereof.
Enchanted Unicorn Advertisement written by IGT, published in 2001, on or before December thereof.
Family Feud Bullseye Advertisement, printed from www.igtonline.com/megajackpots/new__games/family__feud__bullseye__slots.html on Mar. 2, 2005.
Faster Harder More Challenging Q*bert game description [online] [printed on Mar. 12, 2002]. Retrieved from the Internet at <URL:http://www.klov.com/F/Faster__Harder__More__Challenging__Q*bert.html>.
Field Testing New Slots Article, written by Melissa Cook, published in Strictly Slots, Jul. 2000.
Fire and Fortune written by Anchor Games, published in Strictly Slots, May 2001.
Fishin' Buddies Article published in Strictly Slots/Anchor Games, published in Apr. 2001.
Fox 'N' Hound written by IGT, published in 2000, in or before December thereof.
Free! 7-Day Trial on Daval's Reel Dice Advertisement written by Gerber & glass, published in 1936, in or before December thereof.
Fundamentals of Craps book [In Part], written by Mason Malmuth and Lynne Loomis, published in 1995, in or before December thereof.
Gold Exchange Advertisement, written by Bally Gaming Systems, available in 2005, in or before December thereof.
Gotlieb Emulator Project, written by Lee Taylor, [online] [printed on Mar. 12, 2002]. Retrieved from the Internet at <URL:http://www.defender.demon.co.uk/qbert.html>.
Happy Camper Advertisement written by IGT, published in 2001, on or before December thereof.
Hot Flashes Advertisement, written by IGT, published in 2005, in or before December thereof.
I Love Lucy Advertisement, written by IGT, published in 2002, in or before December thereof.
In Between Game Description, written by IGT, available prior to 2000, in or before December thereof.
Inca Sun Article, written by Aristocrat, published in Strictly Slots Apr. 2002.
Introducing the "Smiling Ape" Machine Advertisement (including Joker's Wild Poker description) written by IGT, published prior to Jan. 2002.
It's a Blast Video Slots Game King Series Game Advertisement, published by IGT in 2004, in or before December thereof.
Jackpot Party Brochure and Articles written by WMS Gaming, Inc., published in 1988, on or before December thereof.
Jazzy Jackpots Atronic Americas Article, published by Strictly Slots Mar. 2001.
Jazzy Jackpots Cashline Advertisement, published by Atronic in 2000, in or before December thereof.
Jester Brochure, written by IGT, published in 1999, in or before December thereof.
Joker's Wild Advertisement written by IGT, published prior to Jan. 2002.
Jumping Jackpots Advertisement written by Atronic Casino Technology, Ltd., published in 2003, in or before December thereof.
King of the Nile Advertisement, written by Aristocrat Technologies, published in Strictly Slots Sep. 2003.
Kismet Advertisement, written by Atronic Casino Technology, Ltd., published in 2004, in or before December thereof.
Leopard Spots™ [online] [printed on Mar. 21, 2001]. Retrieved from the Internet at <URL:http:///www.igt.com>.
Levy Patent Abstract written by Derwent Publications Ltd., published in 1991 in or before December thereof.
Little Green Men, Jr. Advertisement written by A.C. Coin and Slot Services Company, published prior to Jan. 2003.
Loco Loot Article written by Strictly Slots/Aristocrat Leisure Industries, PTY Ltd., published in May 2002.
Luau Party Article, written by Bally Gaming Systems, published in Strictly Slots Mar. 2005.
Mata Hari Slots—5 Reel/9 Line. Advertisement, written by IGT, published in 2004, in or before December thereof.
Mata Hari Slots Vision Series Advertisement, written by IGT, published in 2002, in or before December thereof.
Mayan Wheel of Gold Article, published by Strictly Slots prior to Sep. 30, 2004.
Mega Multiplier®, [online] [printed on May 22, 2001]. Retrieved from the Internet at <URL:http://www.wmsgaming.com>.
Mikohn Solutions Article in the World Gaming Congress 2000 Edition, in or before December thereof.
Money Grab, [online] [printed on May 22, 2001]. Retrieved from the Internet at <URL: http://www.wmsgaming.com>.
Money in the Bank Advertisement written by Konami Gaming, published in Jun. 2001.
Money Mouse Brochure written by Arist O Crat Leisure Industries, published in 1997, in or before December thereof.
Monopoly Brochures and Articles, written by WMS Gaming, Inc., published in 1998, in or before December thereof.
Monopoly Moneyline, written by WMS Gaming, published in Strictly Slots Nov. 2003.
Monopoly Party Train Article, published in Strictly Slots Feb. 2002.
Monte Carlo Advertisement, written by Bally Gaming Systems, published in 2002, in or before December thereof.
Mountain Money Article written by Strictly Slots/Aristocrat Leisure Industries, PTY Ltd., published in Jun. 2002.
Munsters Article and Website page, Strictly Slots, IGT, undated, printed on Mar. 21, 2001.
The Munsters iGame-Plus Series Advertisement, written by IGT, published in 2001, in or before December thereof.
The Munsters International Game Technology Advertisement, published in Strictly Slots, Apr. 2001.
Mystical Mermaid Video Slots Advertisement, published by IGT prior to 2003, in or before December thereof.
Neon Nights written by IGT, published in 2000, in or before December thereof.
New Kids Article, published by Strictly Slots in Dec. 2000.
On the House Advertisement, written by Olympic Video Gaming, published prior to 2002, in or before December thereof.
On the Money Article written by Casino Data Systems, published by Strictly Slots in Dec. 2000.
Penguin Pays Advertisement written by Aristocrat Incorporated, published in 1998, on or before December thereof.
Pick'em Poker Plus Advertisement written by Bally Gaming in 2002, in or before December thereof.
Polly & Roger Brochure written by VLS, Inc., published in 2000, in or before December thereof.
Price is Right "Cliff Hangers" description [online] [printed on Mar. 21, 2001]. Retrieved from the Internet at <URL:http://www.geocities.com; members.aol.com>.
Price is Right "Showcases" description [online] [printed on Mar. 16, 2001]. Retrieved from the Internet at <URL:http://www.schuminweb.com>.
Pyramid-Power!! Advertisement, written by MegaJackpots News, published prior to Oct. 1, 2005.
Q*bert Board Game Instructions written by Parker Brothers, published in 1983, in or before December thereof.

Q*bert: Classic Video Game surrealism from the Golden age of Arcade Games written by e-glide, [online] [printed on Mar. 12, 2002]. Retrieved from the Internet at <URL:http://www.users.rcn.com/e-glide/qbert2.html>.

Q*bert Game description written by The Killer List of Videogames [online] [printed by Mar. 12, 2002]. Retrieved from the Internet at <URL:http://ww.klov.com/Q/Q*bert.html>.

Q*bert's Qubes Game Description written by The Killer List of Videogames [online] [printed on Mar. 12, 2002]. Retrieved from the Internet at <URL:http://www.klov.com/Q/Q*bert's_Qubes.html>.

Q*bert Video Game Advertisement written by Pennsylvania Gameroom Warehouse [online] [printed on Mar. 12, 2002]. Retrieved from the Internet at <UR:http://www.gameroomwarehouse.com/videogame/qbert.html>.

Q*bert Video Game Advertisement for PlayStation, [online] [printed on Mar. 12, 2002]. Retrieved from the Internet at <URL:http://www.amazon.com>.

Q*bert Game Cartridge Instruction for ATARI 2600 Game System written by Parker Brothers, [online] printed on Feb. 12, 2002]. Retrieved from the Internet at <URL:http://www.hasbro.com/default.asp?x=cc_gameandtoyinstructions>.

Q*bert Video Game Cartridge Instructions for ATARI Home Computer written by Parker Brothers, [online] [printed on Feb. 12, 2002]. Retrieved from the Internet at <URL:http://www.hasbro.com/default.asp?x=cc_game and toyinstructions>.

Q*bert Video Game Cartridge Instructions for Colecovision Game System written by Parker Brothers, [online] [printed on Mar. 12, 2002]. Retrieved from the Internet at <URL:http://www.hasbro.com/defaultasp?x=cc_game and toyinstructions>.

Q*bert Video Game Cartridge Instructions for Intellivision Game System written by Parker Brothers, [online] [printed on Mar. 12, 2002]. Retrieved from the Internet at <URL:http://www.hasbro.com/default.asp?x=cc_gameandtoyinstructions>.

Q*bert Video Game Cartridge Instructions for Texas Instruments 99/4A Game System written by Parker Brothers, [online] [printed on Mar. 12, 2002]. Retrieved from the Internet at <URL:http://www.hasbro.com/default.asp?x=cc_gameandtoyinstructions>.

Red Baron Article written by Aristocrat, published in Strictly Slots in Feb. 2005.

REEL MAGIC™ Gaming Machine Description written by IGT, available in 1986, on or before December thereof.

Reelin-n-Rockin Advertisement, published by Aristocrat, published in 1999, in or before December thereof.

Richard Petty Advertisement written by IGT, published in 2000, in or before December thereof.

Roamin RHINOS™ Video Slots Gaming Machine Description, [online] [printed in 2002 in or before December thereof]. Retrieved from the Internet at <URL:http://www.igt.com/GamingGroup/Games/game_detail.asp?toggle=ovr&pid=5.113.120&type_id=2374&pl=#cnt>.

Rock & Rollin Article, written by Atronic Casino Technology, Ltd., published by Strictly Slots in Jul. 2000.

Roll & Win Advertisement written by WMS Gaming, [online] [printed on Jun. 8, 2001]. Retrieved from the Internet at <URL:http://www.wmsgaming.com>.

The Sign of the Zodiac Atronic Article, published in Strictly Slots, Aug. 2003.

The Sign of the Zodiac Cashline, written by Atronic, published in 2003, in or before December thereof.

The Sign of the Zodiac (e-motion) Atronic Americas Article, published by Strictly Slots in Apr. 2004.

Slot Machines Article written by Marshall Fey, published in 1983, 1989, 1991, 1994 and 1997 in or before December thereof.

Slot Machine Buyer's Handbook, A Consumer's Guide to Slot Machines [In Part] written by David L. Saul and Daniel R. Mead, published in 1998, in or before December thereof.

Slot Machines Pictorial History of the First 100 Years, 5th Edition [In Part], written by Marshall Fey, published 1983 to 1997, in or before December thereof.

Slot Machines on Parade {In Part] written by Robert N. Geddes and illustrated by Daniel R. Mead, published in 1980, in or before December thereof.

SnapShot Artistocrat Technologies Article, published in Strictly Slots, Aug. 2003.

South Park—Dodgeball Advertisement written by IGT, published in 2000, in or before December thereof.

Spam Article written by IGT, published in 2002, in or before December thereof.

Spell Binder Advertisement written by IGT, published in 2000, in or before December thereof.

Spin Til You Win Game Description, written by IGT, published in 1996, in or before December thereof.

Spinning Slots of All Time Advertisement, written by Bally Gaming Systems, published prior to Oct. 1, 2004.

Stars, Bars and Bones Game Description written by P & M Coins, Inc., available 1997, in or before December thereof.

Super Cherry Advertisement written by IGT, published in 2001, in or before December thereof.

Take Your Pick Advertisement written by IGT/Anchor Gaming, published in 1999, in or before December thereof.

Take Your Pick Article published by Strictly Slots in Mar. 2001.

Texas Tea Advertisement written by IGT, published in 2000, in or before December thereof.

The Basics of Winning Video Poker (Chapter VI Deuces Wild & Chapter VII Jokers Wild) written by J. Edward Allen, published in 1990, on or before December thereof.

The Creation of Q*bert written by Warren Davis, [online] [printed on Mar. 12, 2002]. Retrieved from the Internet at <URL:http://www.coinop.org/features/qbstory.html>.

The History of Q*bert written by Jeff Lee, [online] [printed on Mar. 12, 2002]. Retrieved from the Internet at <URL:http://www.users.aol.com/JPMLee/qbert.htm>.

The Latest Buzz Article, written by Bally Gaming Systems, published in 2000, on or before December thereof.

Top Cat Brochure written by WMS Gaming, Inc., published prior to 2001, in or before December thereof.

Top Dollar Brochure written by IGT, published in 1998, in or before December thereof.

Treasure Tunnel, Treasure Wheel Brochure written by Sigma Game, Inc., published prior to 2001, in or before December thereof.

Vision Series™/Good Times™ written by IGT, published in 1999, in or before December thereof.

Wheel Poker Article written by Anchor Games, published in Strictly Slots Nov. 2000.

Wild Bear Salmon Run Advertisement, written by IGT, published in 2003, in or before December thereof.

Wild Streak Advertisement written by WMS Gaming, Inc., published in 2001, on or before December thereof.

Winning Streak Website Description written by WMS Gaming, Inc. (website) [retrieved from the Internet on Mar. 21, 2001].

X Factor Brochure and Website page written by WMS Gaming, Inc., published in 1998, in or before December thereof.

Yahtzee Bonus Advertisement written by Mikohn Winning Solutions Worldwide, published in 1999, in or before December thereof.

Yahtzee Video Game Advertisement written by Mikohn Winning Solutions Worldwide, published in 1999, in or before December thereof.

Your Real Key to Gaming Success Advertisement (including Roll Over Beethoven and Wild Fortune) written by Olympic Video Gaming, published prior to Jul. 31, 2003.

Archer's Legend Article, written by Konomi, published in Strictly Slots Feb. 2005.

At the Hop Advertisement, written by Bally Gaming Systems, published in Fall 2002.

Barn Yard Article, written by Aristocrat Technologies, published in Strictly Slots in Mar. 2002.

Cheesy Money Advertisement, written by Atronic Casino Technology, Ltd., published in 2004, in or before December thereof.

Double Bucks Brochure written by IGT, available prior to Jan. 2006.

Dream Maker Advertisement, written by Atronic Casino Technology, Ltd., published in 2002, in or before December thereof.

Good Times Brochure, written by IGT, published in 1999, in or before December thereof.

Happy Happy Hippy Advertisement, written by Atronic Casino Technology, Ltd., published in 2000, in or before December thereof.
Hot Shot Advertisement, written by Atronic Casino Technology, Ltd., published in 2000, in or before December thereof.
How to Play Q*bert, written by Gottlieb Amusement Games, [online] [printed on Mar. 12, 2002]. Retrieved from the Internet at <URL:http://users.rcn.com/e-glide/howto1.jpg> and <URL:http://users.rcn.com/e-glide/howto2.jpg>.
Loaded Dice game description, written by Konami, published inStrictly Slots in Dec. 2000.
Playboy Slots Fourth Reel Playmate Multiplier Symbols Advertisement, written by Bally Gaming Systems, published in 2003, in or before December thereof.
Playboy Slots introducing the Eye Catching New Playboy EVO Video Slot Advertisement, written by Bally Gaming Systems, published in 2003, in or before December thereof.
Q*bert Video Game Cartridge instructions for Commodore 64 Game System written by Parker Brothers, [online] [printed on Mar. 12, 2002]. Retrieved from the Internet at <URL:http://www.hasbro.com/default.asp?x=cc_gameandtoyinstructions>.
Wild Streak article by WMS Gaming, published in Strictly Slots, Mar. 2001.
Playboy Slots Playmate Bonus-Reel Symbols Advertisement, written by Bally Gaming Systems, published in 2003, in or before December thereof.

* cited by examiner

GAMING DEVICE HAVING EXPANDING AND ROLLING WILD SYMBOLS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Various slot gaming machines are known. Slot gaming machines generally include a plurality of reels. Each reel includes a plurality of symbols. The reels spin after a player places a wager on the game. The reels spin and then stop to display generated combinations of symbols on the reels. If a generated symbol or combination of symbols is a winning symbol or combination of symbols associated with an award, the player receives that award when the generated symbol or combination of symbols appears along an active payline associated with the reels or in a scatter pay. Certain players become frustrated if they "almost win an award" when the symbols necessary for a winning combination substantially appear on the reels but are missing a symbol or are not in the proper configuration or order to produce a winning combination.

One popular game feature which attempts to resolve such frustration in these situations and increase the player's award opportunities is a wild symbol. A wild symbol changes, replaces or functions as one of the symbols on one of the reels after the reels initially spin and stop. This enables the game to change a first or non-winning combination of symbols to a second and possibly winning combination of symbols (e.g., to make a winning combination or align a winning combination on an active payline). In other variations, the wild symbol may move or roam from one symbol position to another symbol position.

There is a continuing need for other ways of manipulating the position of wild symbols on the reels to create winning combinations on the reels. There is also a need for new and different games which employ reels.

SUMMARY

One embodiment of the gaming device and method disclosed herein has a plurality of reels and at least one expanding and roaming wild symbol or wild symbol set. The expanding and roaming wild symbol or wild symbol set moves relative to the reels to provide a player with additional opportunities to win an award. When the wild symbol appears on one of the reels, the wild symbol expands if one of a plurality of designated trigger symbols also appear on one of the reels. That is, the wild symbol expands along the same reel (e.g., to generate a plurality of individual wild symbols along the reel). In one embodiment, the plurality of wild symbols along the reel form the expanded wild symbol set. Each wild symbol set causes each symbol on the reel to act as a wild symbol. Each designated trigger symbol is associated with or determines the number of rolls (i.e., the number of times the expanded wild reel will roam or roll across the reels). A plurality of designated trigger symbols are associated with different numbers of rolls or moves. For each roll, the expanded wild symbol set moves (left to right or right to left) to one of the reels. The reel to which the expanded wild symbol or the expanded wild symbol set moves is randomly determined in one embodiment. That is, the expanded wild symbol set enables a plurality of wild symbols to randomly move or roll from reel to reel for a number of rolls or moves, wherein the number is determined based at least in part on the designated trigger symbol. After each roll, the gaming device performs an award evaluation during which the gaming device determines whether one or more winning combinations are displayed on the reels. One or more awards are associated with the winning combinations and one of such awards is provided to the player when the associated winning combination is displayed on the reels. The expanding and roaming wild symbol or wild symbol set generates more winning combinations for players of the gaming device and gives such players a better chance of obtaining awards while playing the gaming device.

In one alternative embodiment, at least one designated trigger symbol is associated with or determines different numbers of rolls or moves. In one such embodiment, the different numbers of rolls or moves are determined randomly, predetermined or otherwise suitably determined. For example, when a designated trigger symbol is generated on one of the reels, the gaming device associates a number of rolls or moves to that trigger symbol. The gaming device randomly selects one number of rolls or moves from a plurality of such numbers. These numbers of rolls or moves may be weighted, such that low numbers of rolls or moves occur more frequently than high numbers of rolls or moves. In one embodiment, a plurality of designated trigger symbols are each associated with a number of rolls or moves and the designated trigger symbol that occurs on the reels in one play of the game determines the number of rolls or moves for the wild symbol or wild symbol set during that play of the game.

In one embodiment, once the expanded wild reel lands or appears on one of the reels, the designated trigger symbol acts as an individual wild symbol for one or more award evaluations. This additional wild symbol generates more winning combinations for players of the gaming device and gives such players a better chance of obtaining an award while playing the gaming device.

In one embodiment, the gaming device disclosed herein includes a plurality of wild symbols arranged such that they can occur on the reels during the same reel spin. If a plurality of such wild symbols occur and one of the designated trigger symbols occurs, in one such embodiment, each wild symbol is configured to expand and roam independently. For example, if the trigger symbol is associated with three rolls and two wild symbols appear on the reels, a first wild symbol expands along a first reel and a second wild symbol expands along a second reel. After the first and second wild symbols expand, the first and second wild symbols each will independently roll three times across the reels. In this example, the gaming machine provides six total rolls (i.e., three rolls each for two wild symbols). After each roll, the gaming device performs an award evaluation to determine whether any winning combinations appeared on the reels. Enabling a plurality of wild symbols to appear on the reels during the same reel spin generates more winning combinations for players of the gaming device and gives such players a better chance of obtaining an award while playing the gaming device.

In another embodiment, the gaming device disclosed herein includes a plurality of wild symbols arranged such that they can occur on the reels during the same reel spin. If a plurality of such wild symbols occur and one of the designated trigger symbols occurs, in one such embodiment, each wild symbol is configured to expand and roam at the same time. For example, if the trigger symbol is associated with three rolls and two wild symbols appear on the reels, a first wild symbol expands along a first reel and, at substantially the same time, a second wild symbol expands along a second reel. After the first and second wild symbols expand, the first and second wild symbols will roll three times together across the reels and appear on two different reels. In this example, the gaming machine provides three total rolls (i.e., three rolls with two wild symbols moving at substantially the same time). After each roll, the gaming device performs an award evaluation to determine whether any winning combinations appeared on the reels. Enabling a plurality of wild symbols to appear on the reels during the same reel spin generates more winning combinations for players of the gaming device and gives such players a better chance of obtaining an award while playing the gaming device.

Accordingly, one advantage of the gaming device disclosed herein is to provide an expanding and roaming wild symbol in conjunction with a designated trigger symbol. The designated trigger symbol initiates (i.e., expands) the expanded wild symbol and determines a number of rolls or movements across the reels for each expanding wild symbol or wild symbol set. This enables the expanded wild symbol to roam from reel to reel, which provides players with more opportunities to obtain winning combinations on the reels.

Another advantage of the gaming device disclosed herein is to expand the expanding wild symbol across multiple positions on the same reel and move the expanded wild symbol from reel to reel. That is, when the wild symbol is expanded, the wild symbol forms a wild reel or a wild column including a plurality of wild symbols. The wild reel or wild column is moved across the reels, which moves the plurality of wild symbols in unison or independently to a new reel and generates additional award opportunities for a player of the gaming device.

Additional features and advantages are described herein, and will be apparent from, the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
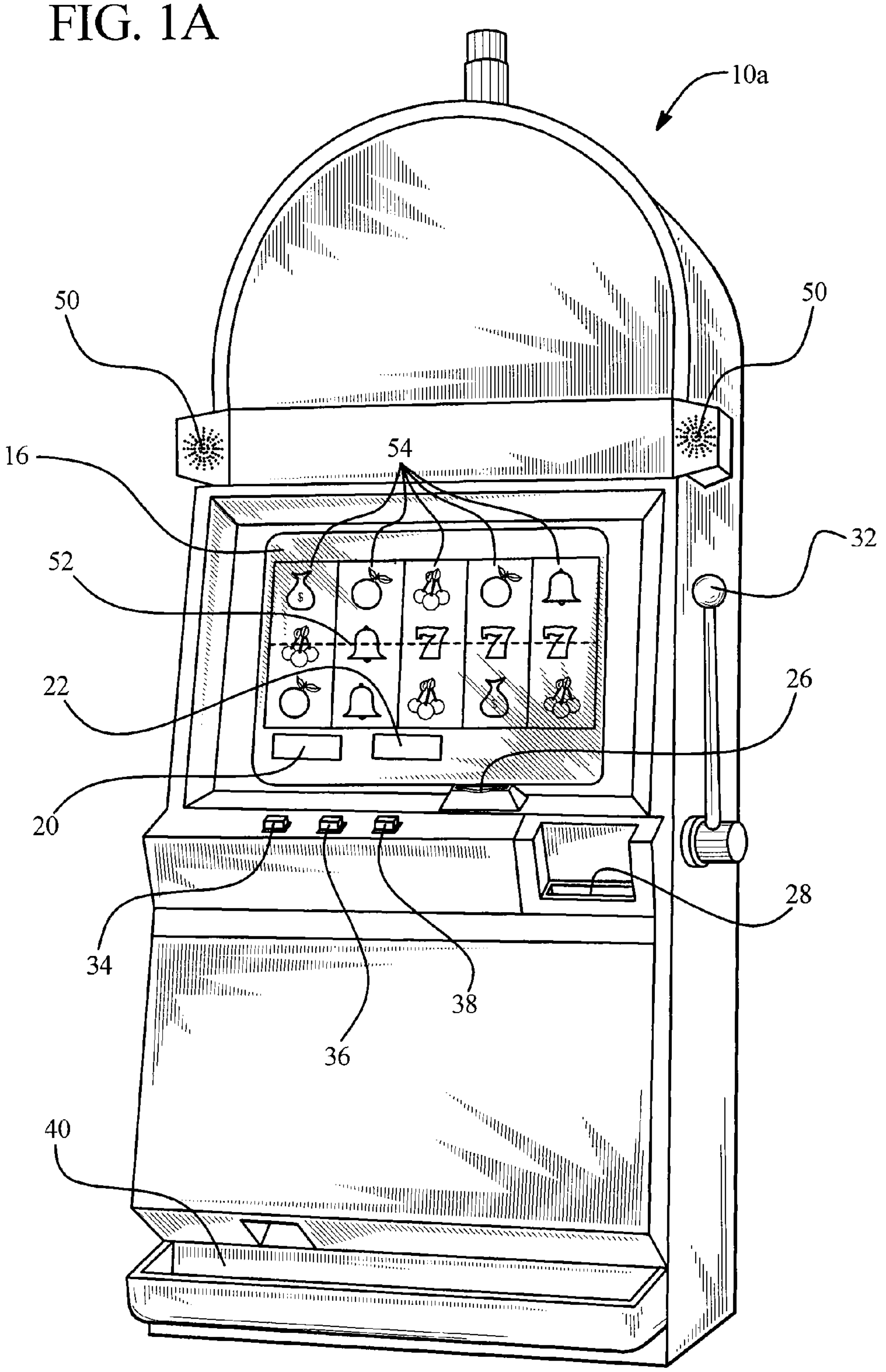
FIG. 1A is a front-side perspective view of one embodiment of the gaming device disclosed herein.
Figure 1B:
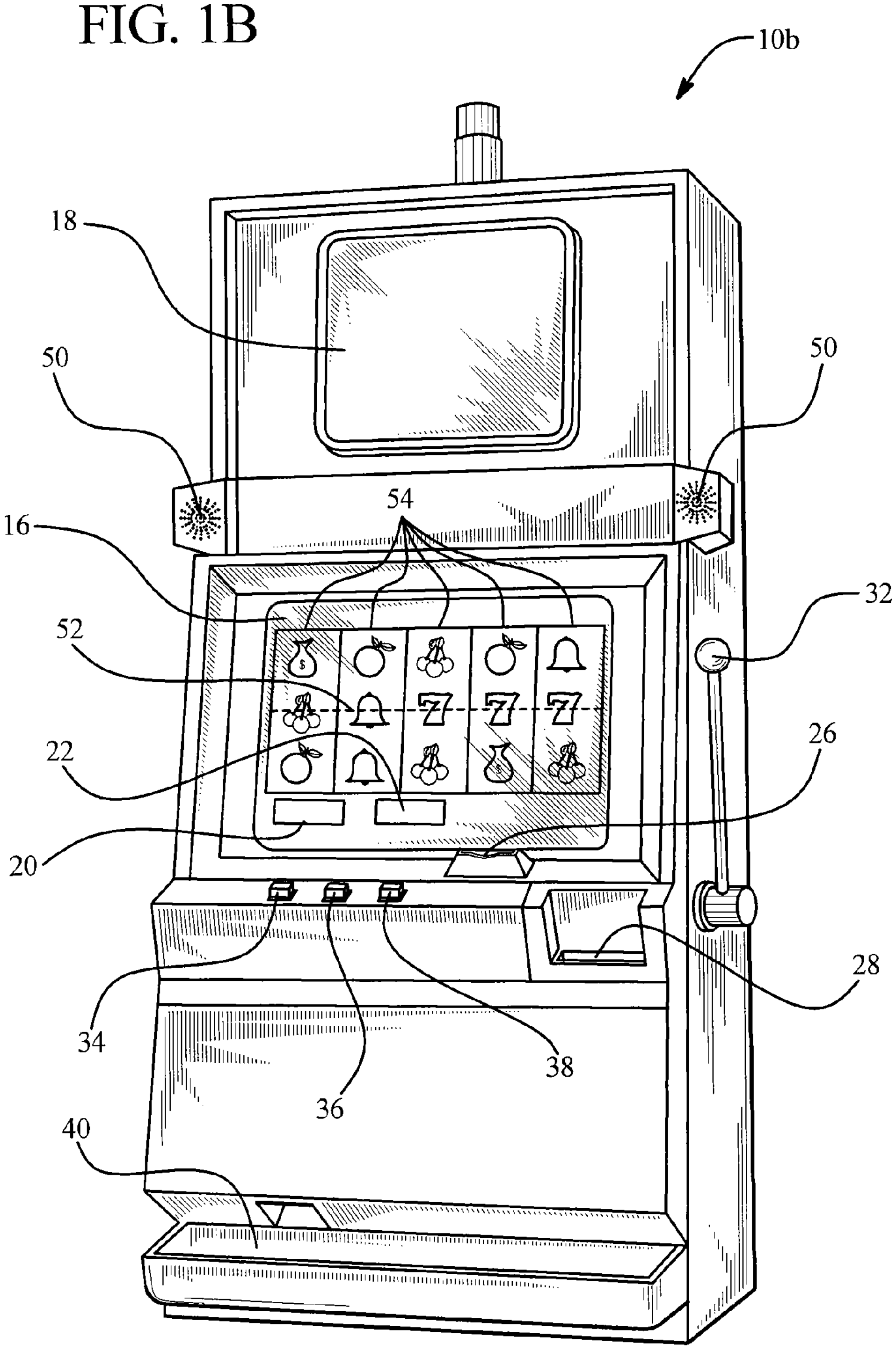
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
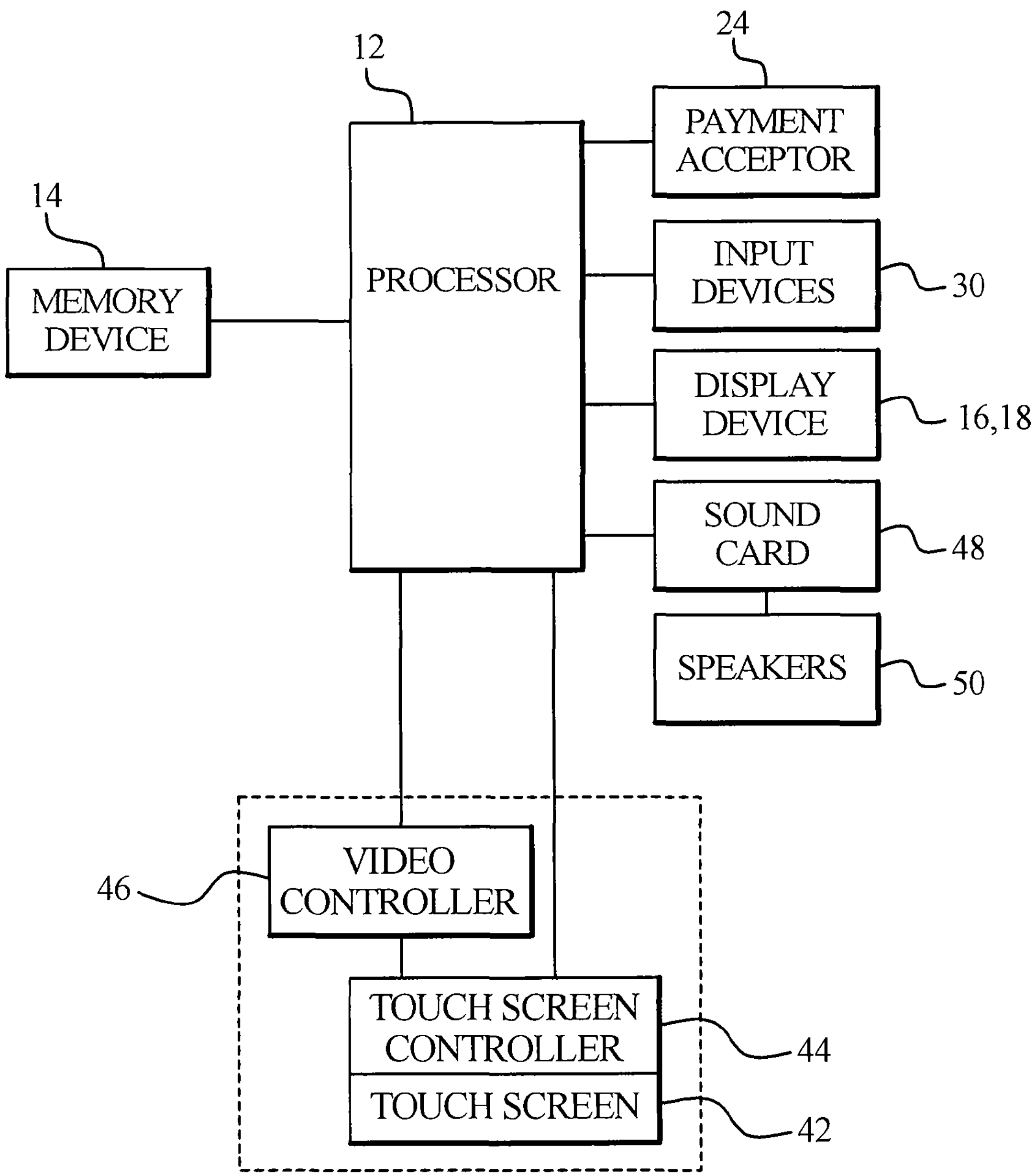
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In a cascading or falling symbol game, symbols fall into place in respective symbol positions displayed on the display device of the gaming device. The symbols move or fall from a top of the display device instead of landing in the respective symbol positions as a plurality of reels stop sequentially (e.g., left to right).

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
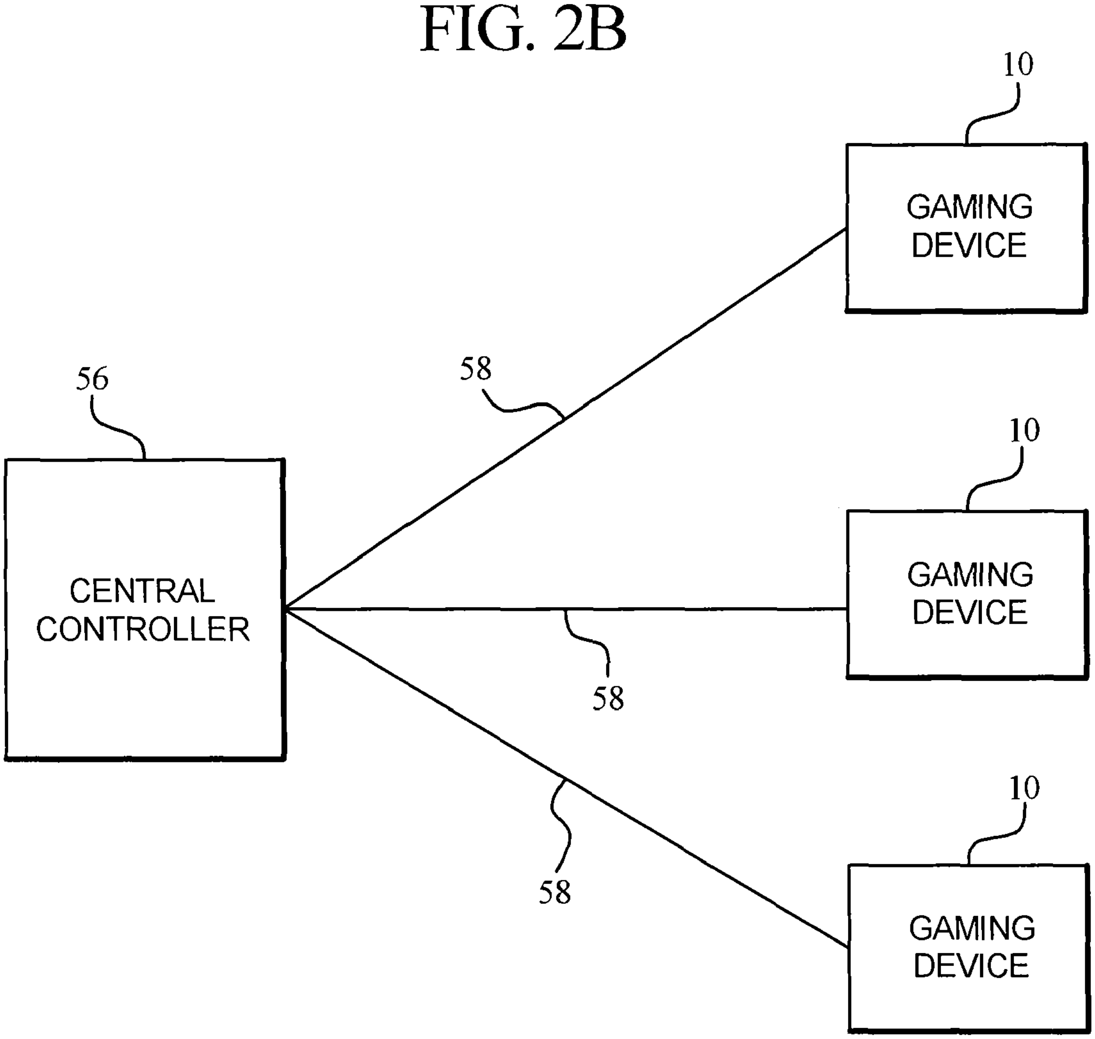
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Expanding and Rolling Wild Symbols

Referring to FIGS. 3A, 3B, 3C, 3D and 3F, one embodiment of the gaming device disclosed herein is illustrated. A display device of the gaming device, such as the display device 16, displays a game on the gaming device. The game employs five reels 102*a*, 102*b*, 102*c*, 102*d* and 102*e* in this embodiment. It should be appreciated that any suitable number of reels may be employed in the game. In this embodiment, each of the reels 102*a*, 102*b*, 102*c*, 102*d* and 102*e* includes a plurality of symbols, which are represented by letters, numbers, or images. The symbols include at least one and preferably a plurality of award symbols 104, trigger symbols 106 and wild symbols 108. The symbols may also include one or more blank symbols or non-award symbols (not shown). It should be appreciated that any suitable number and any suitable types of symbols may be employed in the gaming device.

Each symbol 104, 106 and 108 is positioned at a reel or symbol position on each of the reels 102*a*, 102*b*, 102*c*, 102*d* and 102*e*. In each reel activation, the reels independently spin until each reel stops at a generated reel or symbol position (i.e., a reel stop position) to indicate a combination of symbols along one of a plurality of paylines 110*a* . . . 110*j*. In this embodiment, paylines 110*a* . . . 110*j* are each associated with a row of symbols, wherein the first reel or symbol position of reels 102*a*, 102*b*, 102*c*, 102*d* and 102*e* constitute a first row of symbols. Accordingly, the symbols are indicated or generated on at least one of the paylines 110*a* . . . 110*j* associated with each row of the symbols in the game. In one embodiment, the gaming device employs one or more unisymbol display reels, wherein each symbol on a display of the gaming device represents or is included on a different reel.

Figure 3A:
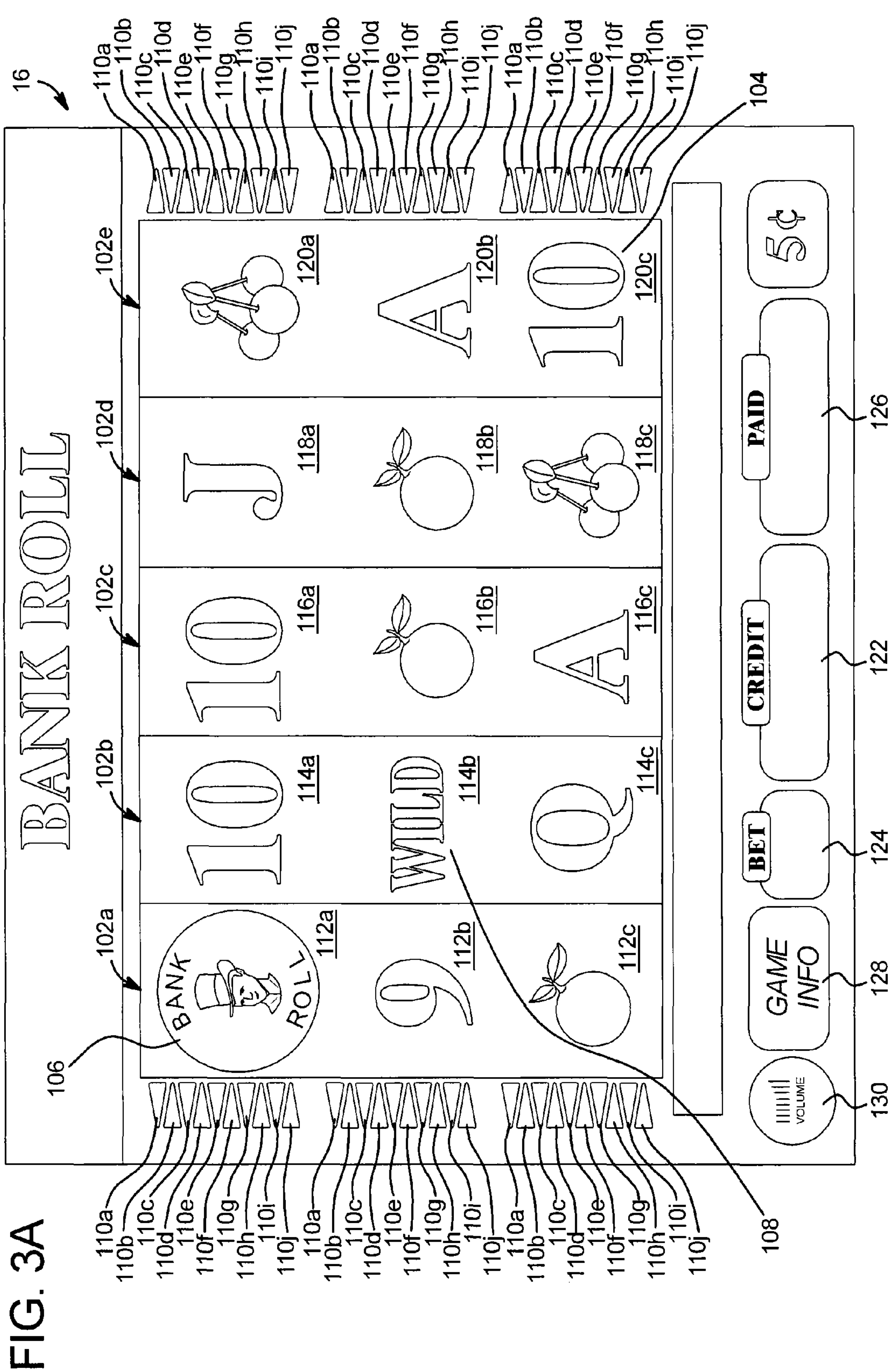
FIGS. 3A, 3B, 3C, 3D, 3E and 3F are front views of a display device of one embodiment of the gaming device, wherein the display device displays a plurality of symbols on a plurality of reels.

Referring to FIG. 3A, one embodiment of the gaming device causes a display device associated with the gaming device to display a plurality of the reels 102*a*, 102*b*, 102*c*, 102*d* and 102*e*. The reels 102*a*, 102*b*, 102*c*, 102*d* and 102*e* each include a plurality of award symbols 104 such as the letters A, K, Q and J, the numbers 9 and 10, an orange or a cherry. The reels also include at least one trigger symbol 106, which is designated with the words "BANK ROLL" in this embodiment but may be designated with any suitable designator or symbol. It should be appreciated that one or more of the reels 102*a*, 102*b*, 102*c*, 102*d* and 102*e* may each include at least one trigger symbol 106. Additionally, one or more of the reels 102*a*, 102*b*, 102*c*, 102*d* and 102*e* may include at least one wild symbol 108. The wild symbol or wild symbols 108 are designated with the word "WILD" but may be designated with any suitable designator or symbol. A probability of being indicated or generated is associated with each of the symbols 104, 106 and 108 on the reels 102*a*, 102*b*, 102*c*, 102*d* and 102*e*. In the game, the probability of each of the symbols 104, 106 and 108 being indicated or generated on one of the reels 102*a*, 102*b*, 102*c*, 102*d* and 102*e* is suitably determined by the game implementer.

In one embodiment, the game begins by activating the reels 102*a*, 102*b*, 102*c*, 102*d* and 102*e*. In the embodiment illustrated in FIG. 3A, the gaming device spins the reels to arrange the symbols at respective stop positions of the reels 102*a*, 102*b*, 102*c*, 102*d* and 102*e*. In one embodiment, the symbols remain associated with their respective stop positions throughout the game. Each reel spins independently of the other reels until each reel stops at a generated stop position to indicate a combination of symbols 104, 106 and 108 along the paylines 110*a* . . . 110*j*. As illustrated in FIG. 3A, each reel 102*a*, 102*b*, 102*c*, 102*d* and 102*e* independently generates three of the symbols 104, 106 and/or 108, which are displayed at respective positions in a plurality of rows. Reel 102*a* is associated with a first reel or symbol position 112*a* which displays the trigger symbol 108, a second reel or symbol position 112*b* which displays the number 9 and a third reel or symbol position 112*c* which displays an orange. Reel 102*b* is associated with a first reel or symbol position 114*a* which displays the number 10, a second reel or symbol position 114*b* which displays the wild symbol 108 and a third reel or symbol position 114*c* which displays the letter Q. Reel 102*c* is associated with a first reel or symbol position 116*a* which displays the number 10, a second reel or symbol position 116*b* which displays an orange and a third reel or symbol position 116*c* which displays the letter A. Reel 102*d* is associated with a first reel or symbol position 118*a* which displays the letter J, a second reel or symbol position 118*b* which displays an orange and a third reel or symbol position 118*c* which displays a cherry. Reel 102*e* is associated with a first reel or symbol position 120*a* which displays a cherry, a second reel or symbol position 120*b* which displays the letter A and a third reel or symbol position 120*c* which displays the number 10.

In one embodiment, the symbols 104, 106 and 108 generated or displayed in an initial spin of the reels remain associated with respective reel or symbol positions of the reels throughout the game. That is, the reels 102*a*, 102*b*, 102*c*, 102*d*, and 102*e* do not spin after the initial spin which keeps the generated or displayed symbols 104, 106 and 108 in the same position throughout the game. For example, each symbol is generated and held stationary (i.e., the reels do not spin) after the initial spin of the reels 102*a*, 102*b*, 102*c*, 102*d* and 102*e*. In another embodiment, the reels 102*a*, 102*b*, 102*c*, 102*d* and 102*e* spin one or more times after the initial spin. Each additional spin generates symbols 104, 106 and 108 in one or more different positions on the reels 102*a*, 102*b*, 102*c*, 102*d* and 102*e*. The reels 102*a*, 102*b*, 102*c*, 102*d* and 102*e* may spin at any suitable point during the game (e.g., after each award evaluation) determined by the game implementer.

A credit display 122 displays the number of credits available to the player to wager or bet on the game. A bet or wager display 124 indicates the number of credits the player wagered or bet on the game. A total award display 126 indicates the total value of the awards accumulated by the player in the game. A paytable display 128 indicates, upon player request or input, information associated with a paytable of the game. Such information may include one or more awards associated with winning symbols or symbol combinations in the game. A volume display 130 indicates the volume at which sounds of the game are presented to the player. Through player input, the volume display 130 enables the player to adjust the volume at which sounds of the game are presented to the player.

As illustrated in FIG. 3A, the wild symbol 108 was generated on the second reel 102*b*. The wild symbol 108 is displayed in association with the second reel or symbol position 114*b* of the second reel 102*b*. When the wild symbol 108 is generated on one of the reels 102*a*, 102*b*, 102*c*, 102*d* and 102*e*, the wild symbol 108 functions as, or changes to, one of the award symbols 104. That is, the wild symbol 108 matches or substitutes for any other symbol 104 within the set of symbols used in the game. In one embodiment, the wild symbol 108 can match or substitute for one of the award symbols 104, one of the trigger symbols 106 or any other symbol used in the game. FIG. 3A illustrates that the wild symbol 108 matches or substitutes for award symbols 104 in the game. In one embodiment, the wild symbol substitutes for one of the symbols indicated on the same payline as the wild symbol. In another embodiment, the wild symbol matches or substitutes for the most desirable symbol on a payline such as a jackpot symbol or the symbol associated with the largest award in the game. In one embodiment, the wild symbol 108 functions as, or changes to, the symbol 104 that completes a winning symbol combination (e.g., the highest winning symbol combination) along one of the paylines. For example, one winning symbol combination may include four orange symbols aligned along one of the paylines.

Figure 3B:
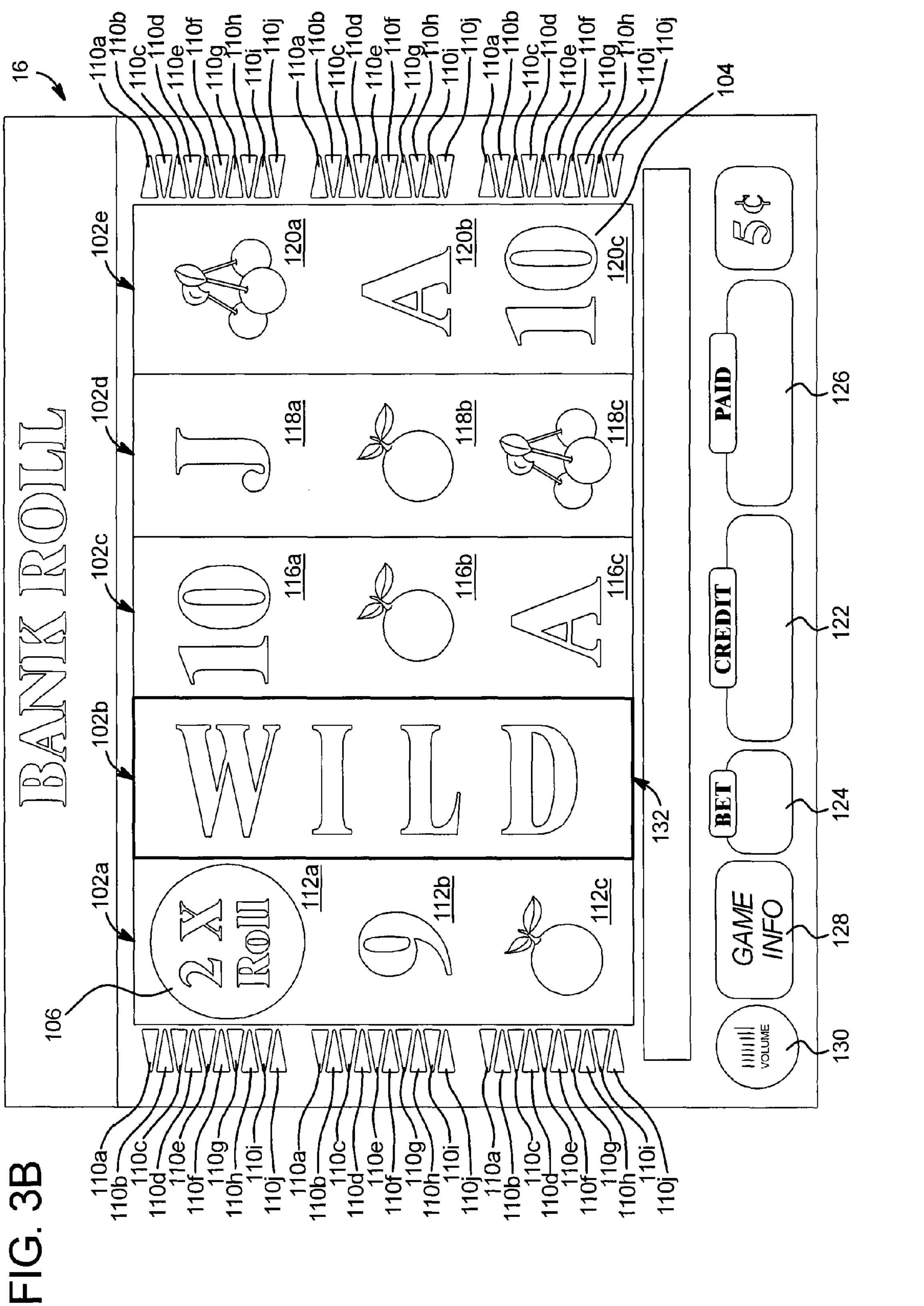

As illustrated in FIGS. 3A and 3B, the trigger symbol 106 is displayed on the first reel 102*a*. The trigger symbol 106 increases the probability that the player will obtain one of the awards in the game by enabling any wild symbol 108 displayed on the reels 102*a*, 102*b*, 102*c*, 102*d* and 102*e* to expand and roll across the reels. If the trigger symbol 106 is displayed on one of the paylines 110*a* . . . 110*j* along with the wild symbol 108, the gaming device initiates a bonus feature to occur in the game. That is, the occurrence of the trigger symbol 106 in combination with the occurrence of the wild symbol 108 on the reels 102*a*, 102*b*, 102*c*, 102*d* and 102*e* initiates the bonus feature of the gaming device. In the bonus feature, the gaming device processor causes each wild symbol displayed on the reels to expand and causes each expanded wild symbol to roll or move to at least one other reel. In one embodiment, the expanded wild symbols roll or move to a randomly determined reel. In one embodiment, the expanded wild symbols roll or move to any of the reels including the same reel from which the expanded wild symbols originally moved. It should be appreciated that if the expanded wild symbols move or roll to the reel from which the expanded wild symbols originally moved, the gaming device processor will pay the player for the same symbol combination(s) before and after the move or roll. That is, a player is provided with the same award twice in separate award evaluations.

The gaming device rolls or moves these expanded wild symbols until a number of moves associated with the trigger symbol are used. After each roll, the gaming device changes the trigger symbol to a wild symbol and performs an award evaluation using the expanded wild symbols and the wild trigger symbol.

In one embodiment, the gaming device processor causes any wild symbols 108 generated on the reels 102*a*, 102*b*, 102*c*, 102*d* and 102*e* to expand to one or more additional reel or symbol positions along the same reel. Each generated wild symbol expands to at least one of the other reel or symbol positions along the same reel to create an expanded wild symbol or an expanded wild symbol set 132. As illustrated in FIG. 3B, the wild symbol 108 associated with the second reel or symbol position 114*b* of the second reel 102*b* expands to the first and third reel or symbol positions 114*a* and 114*c* of the second reel 102*b*. The plurality of individual wild symbols 108 form the expanded wild symbol set 132. It should be appreciated that when the expanded wild symbol set includes a wild symbol that expanded along the same reel (e.g., reel 102*b*), the expanded wild symbol set may be referred to as a wild reel herein.

As illustrated in FIG. 3B, the wild reel 132 overlays the second reel 102*b*, which represents a plurality of individual wild symbols 108 overlaying the symbols 104 of the second reel 102*b*. In one embodiment, the wild symbol 108 expands to a plurality of reel stop positions along the same reel, such as reel 102*b*. That is, a plurality of the wild symbols 108 overlay a plurality of the reel or symbol positions 114*a*, 114*b* and 114*c* along the reel 102*b*. In another embodiment, the wild symbol 108 expands to each reel or symbol position along the same reel, such as reel 102*b*. That is, a plurality of the wild symbols 108 overlay the reel or symbol positions 114*a*, 114*b* and 114*c* along the reel 102*b*.

Figure 3C:
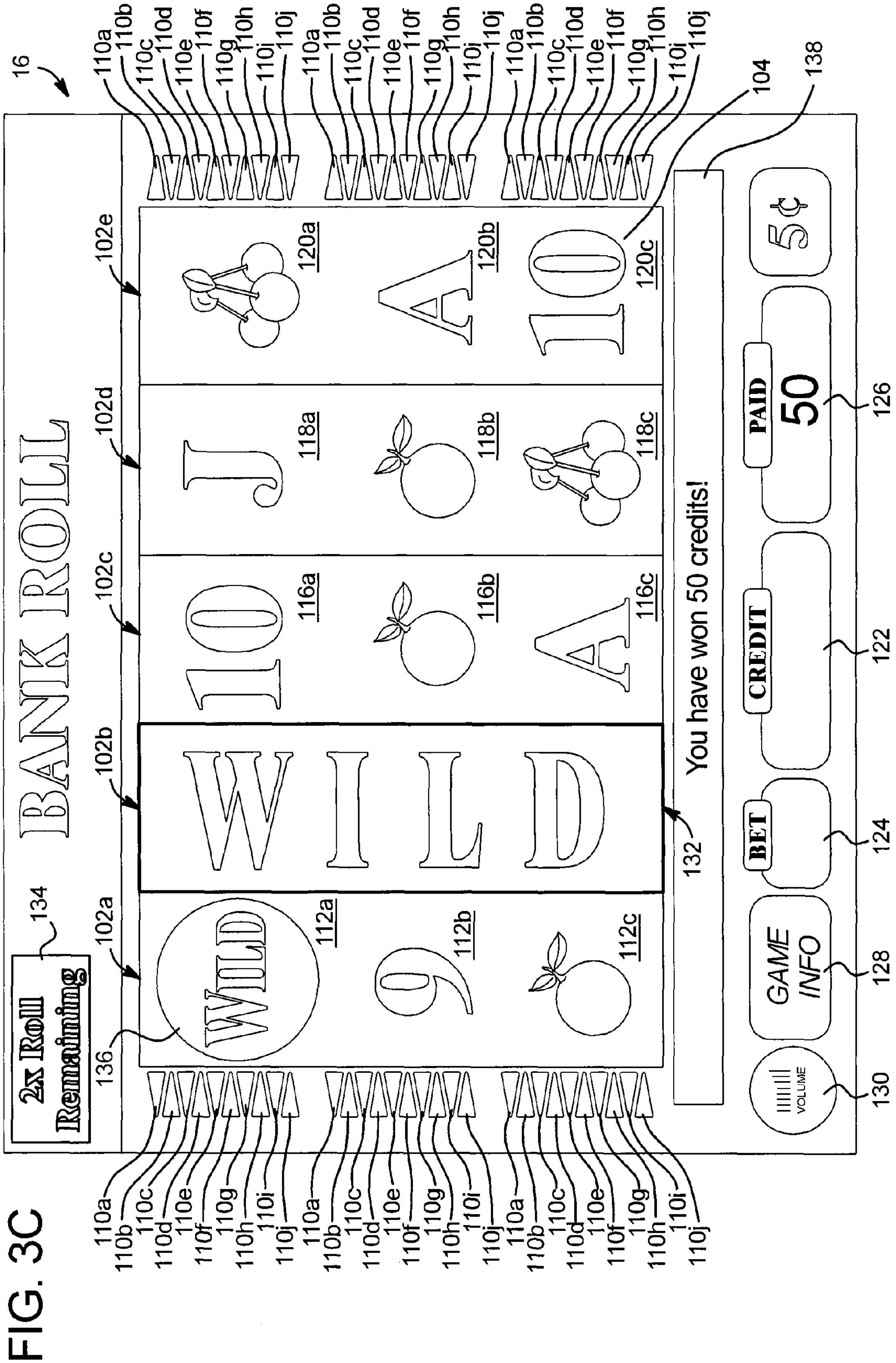

Additionally, the bonus feature includes one or more rolls or moves of the expanded wild reel 132. For example, the wild reel 132 is rolled or moved to overlay one of the reels 102*a*, 102*b*, 102*c*, 102*d* and 102*e*. It should be appreciated that the wild reel 132 may be rolled or moved to overlay the same reel (i.e., the second reel 102*b* in this embodiment) in different moves. That is, the wild reel 132 associated with the reel or symbol positions 114*a*, 114*b* and 114*c* of the second reel 102*b* is moved to the reel or symbol positions of any of the reels (e.g., including the reel 102*b* from which the wild reel originally moved). The number of rolls or moves is associated with, and indicated by, the trigger symbol 106. As illustrated in FIG. 3C, the number of rolls or moves is two rolls and a rolls remaining display 134 indicates the number of rolls or moves remaining in the game. Prior to the first roll or move, the rolls remaining display 134 indicates the number of rolls or moves associated with the trigger symbol 106. As the wild reel 132 completes each move, the rolls remaining display 134 indicates one less roll remaining in the bonus feature and available to the player.

Based on the number of rolls associated with each trigger symbol 106 displayed on the reels 102*a*, 102*b*, 102*c*, 102*d* and 102*e*, the gaming device provides the player with a number of rolls or moves of the expanded wild reel 132 in the game. The number of rolls or moves may be randomly determined, predetermined or determined in any suitable manner. For example, when the designated trigger symbol 106 is generated on one of the reels 102*a*, 102*b*, 102*c*, 102*d* and 102*e*, the gaming device associates a number of rolls or moves to that trigger symbol 106. In one embodiment, the processor of the gaming device randomly selects one number of rolls or moves from a plurality of such numbers. In one embodiment, these numbers of rolls or moves are weighted such that low numbers of rolls or moves occur more frequently than high numbers of rolls or moves.

In an alternative embodiment, a first trigger symbol is associated with a first predetermined number of moves and a second trigger symbol is associated with a second predetermined number of moves. If the first trigger symbol is displayed on the reels, the player is provided with the first number of rolls. In one embodiment, if the first and second trigger symbols are displayed on the reels 102*a*, 102*b*, 102*c*, 102*d* and 102*e*, the player is provided with a total number of rolls including the first number of rolls and the second number of rolls.

The gaming device uses the rolls or moves to activate or spin the expanded wild reel 132 across (i.e., parallel to) the reels 102*a*, 102*b*, 102*c*, 102*d* and 102*e* (e.g., in a left to right direction or in a right to left direction). In one embodiment, the expanded wild reel 132 moves sequentially from reel to reel in a left to right (or right to left) direction. In another embodiment, the expanded wild reel 132 moves randomly from one reel to another reel in one or more directions. The gaming device provides an award associated with one or more winning symbol combinations indicated on one of the paylines associated with the reels. A plurality of awards are associated with the symbols 104 or combinations of the symbols 104 and the awards may be values, credits, free spins, free games, multipliers or any suitable award or awards. The expanded wild reel 132 continues to spin and land on one of the reels 102*a*, 102*b*, 102*c*, 102*d* and 102*e* until no rolls or moves remain in the game as indicated by the rolls remaining display 134.

In one embodiment, the number of rolls or moves is randomly determined. In one such embodiment, the trigger symbol 106 is associated with a plurality of numbers of rolls or moves for the expanded wild symbol 108, wherein one number of rolls or moves is randomly selected to be displayed with the trigger symbol 106. In another embodiment, the number of rolls is predetermined. In one such embodiment, a plurality of trigger symbols 106 are each associated with a designated or predetermined number of rolls or moves. That is, a first trigger symbol may be associated with three rolls or moves and a second trigger symbol may be associated with two rolls or moves. Accordingly, when different trigger symbols 106 are generated on the reels 102*a*, 102*b*, 102*c*, 102*d* and 102*e*, the player is provided with different numbers of rolls or moves for the expanded wild reel 132. In one embodiment of the gaming device, the number of rolls or moves associated with the trigger symbol 106 can be determined based on a predetermined number, a randomly determined number, or a number based on another functional game element such as the player's wager, the player's wager level (e.g., a maximum wager), the player's status (as determined through a player tracking system) or the amount of time the player has played the game. In one embodiment, the number of rolls or moves associated with the trigger symbol is based on the number of triggering symbols displayed on the reels. Alternatively, the gaming device may enable a plurality of moves, wherein the moves end based on some designated criteria, such as a terminator symbol appearing on one of the reels. In one such embodiment, the reels 102*a*, 102*b*, 102*c*, 102*d* and 102*e* spin after each move or roll. If a terminator symbol occurs on one of the reels, the bonus feature ends and the player is provided with any award won during the bonus feature. If a terminator symbol does not occur on the reels, the player is provided with another roll or move.

It should be appreciated that the bonus feature includes the expansion of a wild symbol, such as to form a wild reel 132, and the movement of the wild reel 132 to generate additional award opportunities for the player. After the wild symbol 108 expands, the processor of the gaming device performs an award evaluation as illustrated in FIG. 3C. During the award evaluation, the processor determines whether one or more winning symbol combinations were generated and displayed on the reels 102*a*, 102*b*, 102*c*, 102*d* and 102*e*. One or more awards are associated with the winning symbol combinations and one of such awards is provided to the player when the associated winning symbol combination is displayed on the reels 102*a*, 102*b*, 102*c*, 102*d* and 102*e*. For example, a combination of four orange symbols may be associated with an award of 50 credits and a combination of five 10 symbols may be associated with 200 credits.

As illustrated in FIG. 3C, orange symbols were generated on the first, third and fourth reels 102*a*, 102*c* and 102*d* and are displayed in association with the respective reel or symbol positions 112*c*, 116*b* and 118*b* of those reels 102*a*, 102*c* and 102*d*. The wild symbol 108 and the orange symbols are each displayed along the same payline. In this example, the wild symbol 108 functions as, or changes to, an orange symbol. The wild symbol 108 cooperates with the orange symbols of the first, third and fourth reels 102*a*, 102*c* and 102*d* to complete a winning symbol combination, such as four oranges associated with 50 credits. An award display 138 may inform the player of the number of credits won via messaging, such as "YOU HAVE WON 50 CREDITS!" or "FOUR ORANGES PAY 50 CREDITS!" Accordingly, the award is provided to the player and added to the total award display 126. As illustrated in FIG. 3C, the total award display 126 indicates that the player won 50 credits.

Figure 3D:
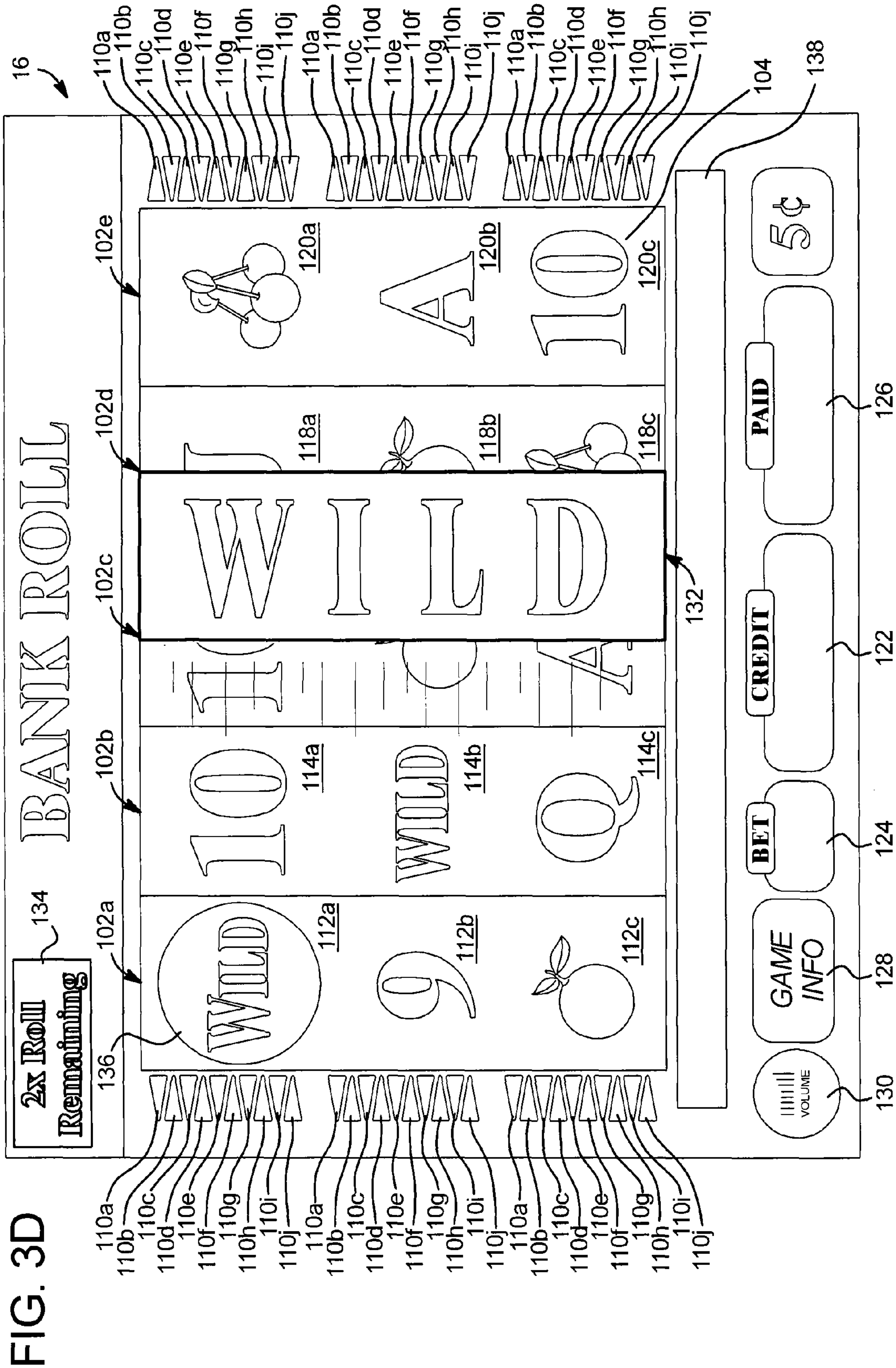
Figure 3E:
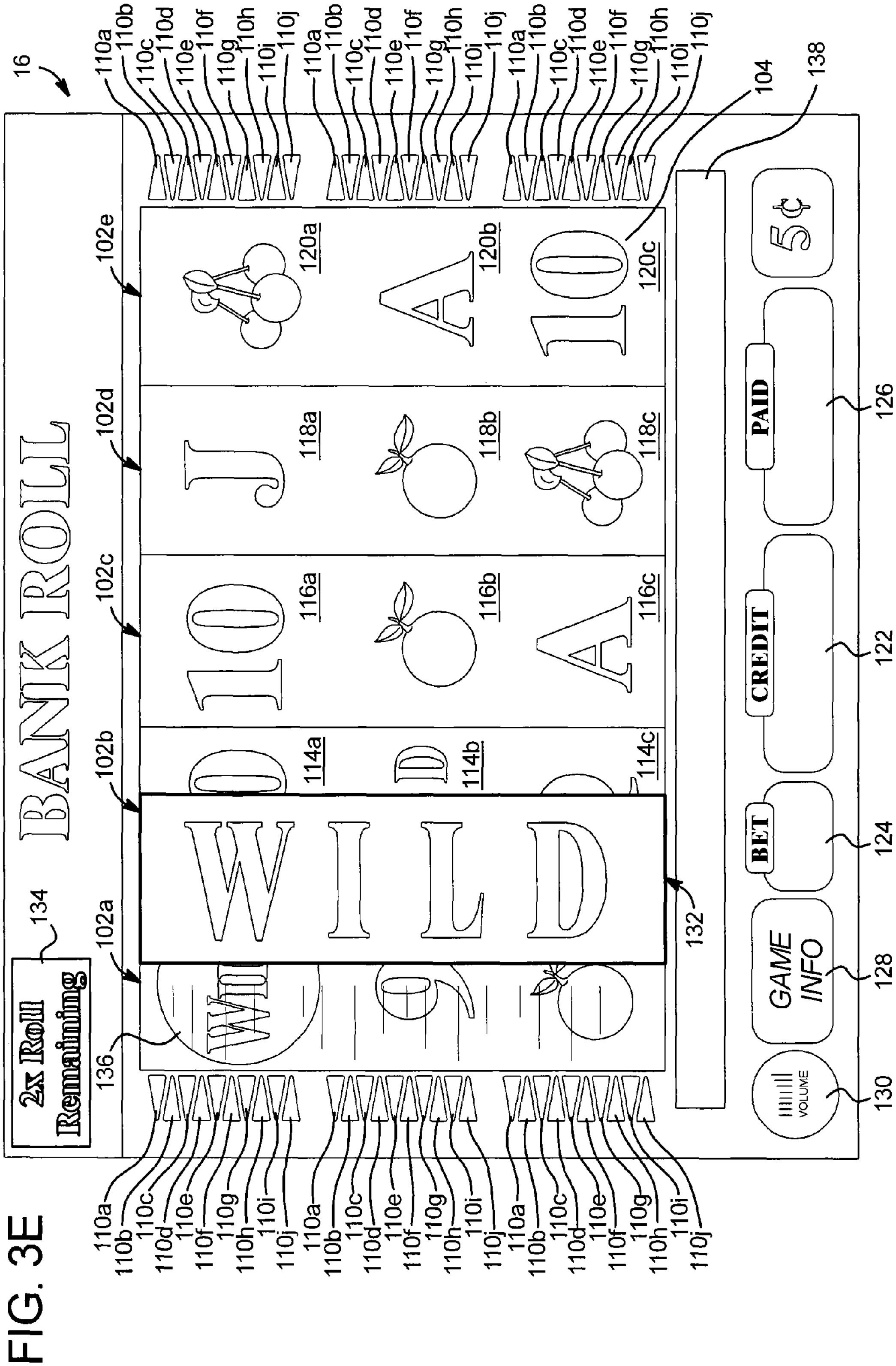

FIGS. 3D and 3E illustrate the wild reel 132 rolling or moving across the reels 102*a*, 102*b*, 102*c*, 102*d* and 102*e* sequentially reel to reel in a left to right direction. That is, the wild reel 132 moves from the second reel 102*b* to the third reel 102*c*, from the third reel 102*c* to the fourth reel 102*d* and from the fourth reel 102*d* to the fifth reel 102*e*. From the fifth reel 102*e*, the wild reel 132 moves to the first reel 102*a* and continues rolling across the reels 102*b*, 102*c*, 102*d*, 102*e* and 102*a* sequentially reel to reel until landing or stopping on one of the reels. In one embodiment, the wild reel 132 is configured to roll or move across the reels sequentially reel to reel in a right to left direction. In another embodiment, the wild reel 132 is configured to roll or move across the reels in a left to right direction for a first roll or move and to roll or move across the reels in a right to left direction for a second roll or move. It should be appreciated that the trigger symbol 106 may display a theme-based symbol, such as a character with a top hat or any other suitable symbol, during the rolling or movement of the wild reel 132. In one embodiment, this theme-based symbol is, or functions as, a wild symbol.

Figure 3F:
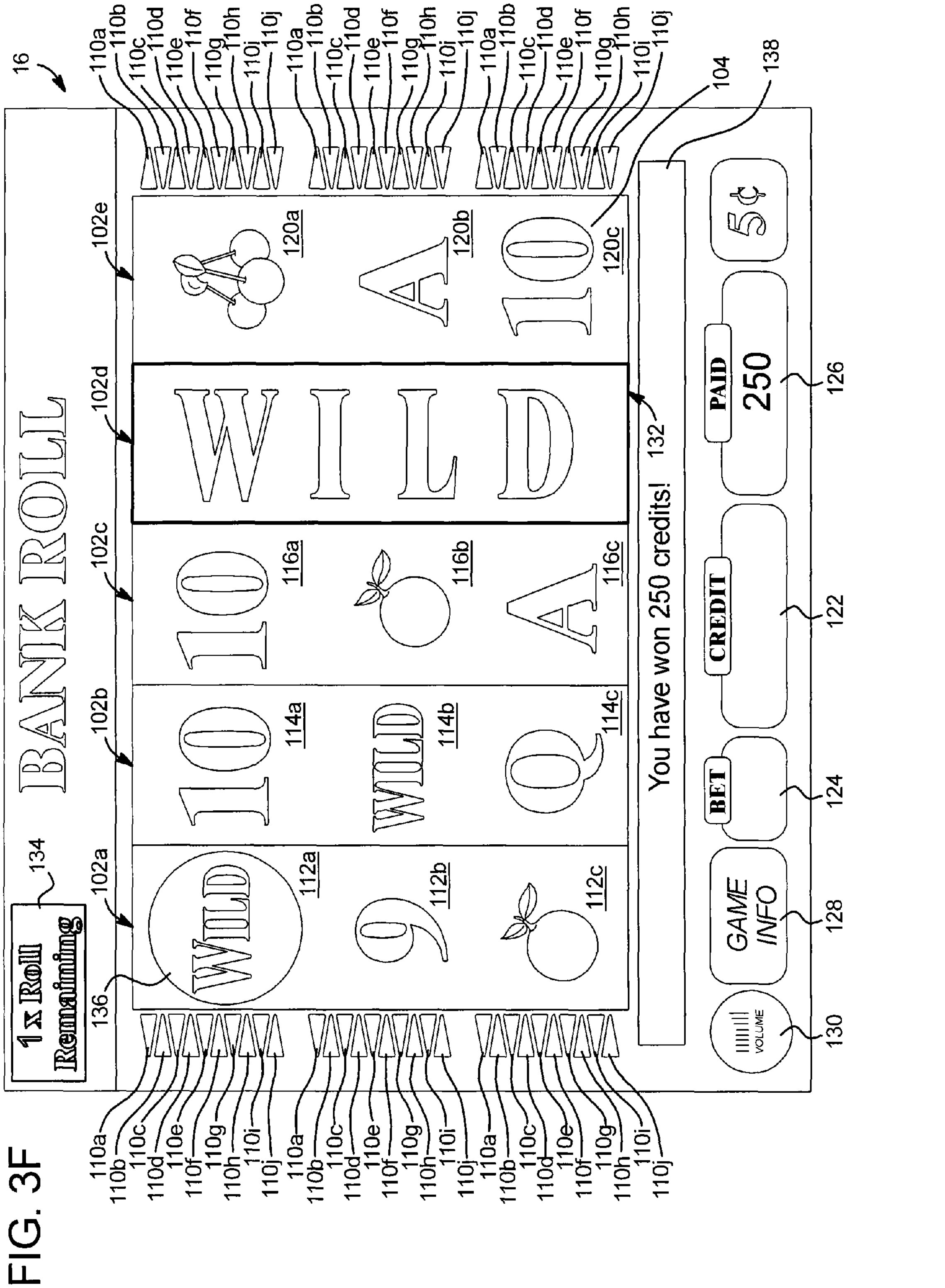

FIG. 3F illustrates the end of one roll or move of the wild reel 132. As illustrated, the wild reel 132 landed on the fourth reel 102*d* and overlays the symbols 104 of reel or symbol positions 118*a*, 118*b* and 118*c* of the fourth reel 102*d*. Upon the completion of each roll or move, the processor of the gaming device performs an additional or subsequent award evaluation. Prior to such award evaluation, the trigger symbol 106 changes to, and functions as, a wild symbol 136 for the additional or subsequent award evaluation. As illustrated, the wild symbol 136 along with the 10 symbols on the second, third and fifth reels 102*b*, 102*c* and 102*e* and the wild symbol associated with the second reel position 118*b* of the fourth reel 102*d* form a winning symbol combination, such as five 10 symbols. As discussed above, the winning symbol combination of five 10 symbols may be associated with an award of 200 credits. An award display 138 may inform the player of the total number of credits won in the bonus feature via messaging, such as "YOU HAVE WON 250 CREDITS!" in text, audible, visual or any other suitable format. It should be appreciated that the message may inform the player of the award won in a current award evaluation, such as "FIVE 10 SYMBOLS PAY 200 CREDITS!" Accordingly, the award is provided to the player and added to the total award display 126. As illustrated in FIG. 3D, the total award display 126 indicates an award of 250 credits. The total award includes the amount won in the current award evaluation (e.g., 200 credits) and any previous award evaluation (e.g., 50 credits).

As illustrated in FIG. 3F, the player has one roll or move remaining as indicated by the rolls remaining display 134. In one embodiment, the player uses the remaining rolls or moves to roll or move the expanded wild reel 132 one more time in the bonus feature. In another embodiment, the game ends when the player obtains an award in the game. In another embodiment, the game ends when the player has no remaining rolls. In another embodiment, the game ends when the player has no remaining rolls, but instead of providing the player a predetermined number of moves, the player is enabled to roll the expanded wild until the player loses.

In one embodiment, the gaming device includes overlapping expanded and roaming wild symbols. For example, a first expanded wild symbol may be associated with two rolls and a second expanded wild symbol may be associated with three rolls. In one embodiment, the first and second expanded wild symbols roll together (i.e., at substantially the same time) to one of the reels. In another embodiment, the first and second expanded wild symbols roll independently. Alternatively, in an embodiment where the reels spin after each movement of the expanded wild reel, a first expanded wild symbol is associated with two moves. In a first move, the first expanded wild symbol moves to one of the reels. After this movement, the reels spin and generate symbols in respective reel or symbol positions. If one of the symbols includes a second wild symbol, the second wild symbol expands and is associated with a number of moves, such as two moves. In a second move of the first expanded wild symbol and a first move of the second expanded wild symbol, the first and second expanded wild symbols move to one of the reels. After this movement, the first expanded wild symbol has no remaining rolls and may be (1) changed to the symbols 104, 106, 108 underlying the expanded wild symbols or (2) kept as wild symbols. The second expanded wild symbol then moves to another reel. In this embodiment, the bonus game ends when each expanded wild symbol has no remaining rolls or moves.

In one embodiment of the gaming device disclosed herein, the gaming device enhances a player's opportunity to obtain one or more awards in a game by utilizing the expanded and roaming wild reel 132 to provide a better opportunity of obtaining an award in the game. In this embodiment, the processor of the gaming device holds the reels, other than the expanded wild reel 132, stationary for each roll or move of the expanded wild reel 132. The expanded and roaming wild reel 132 moves relative to the stationary reels.

In another embodiment, the processor of the gaming device holds the expanded wild reel 132 stationary and moves the reels relative to the expanded wild reel 132 for each roll or move associated with the trigger symbol 106. For example, each roll or move associated with each trigger symbol 106 that appears on the reels causes one or more symbols to move relative to the expanded wild reel. In one move or roll, the symbols on the reels may shift one reel or symbol position in any direction (e.g., left, right or any other suitable direction) relative to the expanded wild reel.

In another embodiment of the gaming device disclosed herein, the processor of the gaming device spins the reels, including the expanded wild reel 132, for each roll or move of the expanded wild reel 132. For example, after the expanded wild reel 132 rolls to one of the reels, the reels other than the expanded wild reel 132, are spun to display different symbols 104, 106 and 108 on the reels. The award or awards, if any, associated with any winning symbol combinations occurring on one of the paylines is provided to the player.

In one embodiment, the gaming device disclosed herein includes a plurality of wild symbols arranged such that they can occur on the reels during the same reel spin. If a plurality of such wild symbols occur, in one such embodiment, each wild symbol is configured to expand and roam independently. For example, if the trigger symbol is associated with three rolls and two wild symbols appear on the reels, a first wild symbol expands along a first reel and a second wild symbol expands along a second reel. After the first and second wild symbols expand, the first and second wild symbols each will independently roll three times across the reels. In this example, the gaming machine provides six total rolls (i.e., three rolls each for two wild symbols). After each roll, the gaming device performs an award evaluation to determine whether any winning combinations appeared on the reels. Accordingly, enabling a plurality of wild symbols to appear on the reels during the same reel spin generates more winning combinations for players of the gaming device and gives such players a better chance of obtaining an award while playing the gaming device.

In another embodiment, the gaming device disclosed herein includes a plurality of wild symbols arranged such that they can occur on the reels during the same reel spin. If a plurality of such wild symbols occur and one of the designated trigger symbols occurs, in one such embodiment, each wild symbol is configured to expand and roam at substantially the same time. For example, if the trigger symbol is associated with three rolls and two wild symbols appear on the reels, a first wild symbol expands along a first reel and, at substantially the same time, a second wild symbol expands along a second reel. After the first and second wild symbols expand, the first and second wild symbols will roll three times together across the reels and appear on two different reels. In this example, the gaming machine provides three total rolls (i.e., three rolls with two wild symbols moving at substantially the same time).

In one embodiment of the gaming device disclosed herein, the symbols on the reels include at least one bonus symbol. When the bonus symbol is indicated on one or more designated paylines in a game, the gaming device provides an additional award or bonus award in the game. The bonus award associated with the bonus symbol may be at least one additional roll or at least one free roll of the expanded wild reel. It should be appreciated that the bonus award may be any suitable award as desired by the game implementer. The bonus award enables a player to obtain additional awards or additional rolls of the expanded wild reel in a game, which further increases the player's opportunities to win an award in the game and enhances the player's excitement and enjoyment of the game.

In another embodiment, a probability of being indicated on one or more paylines associated with the reels is associated with each of the symbols on the reels. In one embodiment, the probability associated with the wild symbol and/or the trigger symbol is less than at least one of the probabilities associated with the other symbols on the reels. In another embodiment, the probability associated with the wild symbol and/or the trigger symbol is less than a plurality of the probabilities associated with the other symbols on the reels. In a further embodiment, the probability associated with the wild symbol and/or the trigger symbol is less than all of the probabilities associated with the other symbols on the reels. It should be appreciated that the probabilities associated with the symbols may be any suitable probabilities as desired by the game implementer.

In one alternative embodiment, the gaming device disclosed herein includes a plurality of reels and a duplicating and roaming wild symbol that independently moves relative to the reels to provide a player with additional opportunities to win an award. Each reel includes a plurality of reel or symbol positions that represent a position or area in which a designated symbol appears on the reel. When a wild symbol appears on one of the reels, the wild symbol duplicates to other reel or symbol positions when a designated trigger symbol also appears on one of the reels. That is, the wild symbol duplicates to at least one other reel or symbol position of the same reel or of a different reel. Each duplicated wild symbol overlays or replaces one symbol on the reels and causes each replaced symbol to act as a wild symbol. The designated trigger symbol is associated with a number of duplications (i.e., the number of times the wild symbol will duplicate) and a number of rolls (i.e., the number of times the wild symbol will roll across the reels). In one embodiment, the number of duplications and/or the number of rolls is determined based on a predetermined number, a randomly determined number, or a number based on another functional game element such as the player's wager, the player's status (as determined through a player tracking system) or the amount of time the player has played the game.

In one embodiment, separate and different trigger symbols are associated with a different numbers of duplications and/or different numbers of rolls. For example, upon the occurrence of a first trigger symbol, the wild symbol may duplicate a first designated number of times (e.g., three times) and upon the occurrence of a second trigger symbol, the wild symbol may duplicate a second designated number of times (e.g., two times). In this example, it should be appreciated that each wild symbol may duplicate to other reel or symbol positions, roll to one of the reels, or duplicate and roll.

In this embodiment, each duplicated wild symbol rolls (left to right or right to left) to one of the reels for each roll associated with the trigger symbol. The reel to which the duplicated wild symbol moves is randomly determined in one embodiment. That is, each duplicated wild symbol randomly moves or roams from reel to reel for a number of rolls or moves. In one embodiment, each duplicated wild symbol randomly and independently moves or roams from reel to reel. That is, a first duplicated wild symbol rolls to a first reel and a second duplicated wild symbol rolls to a second reel (which may be the same or different reel as the first reel). In one embodiment, when the duplicated wild symbols land on respective reels, the designated trigger symbol acts as an individual wild symbol for an award evaluation. During the award evaluation, the gaming device determines whether one or more winning combinations are displayed on the reels. The duplicating and roaming wild symbol and the individual wild symbol generate more winning combinations for players of the gaming device and give such players a better chance of obtaining an award while playing the gaming device.

In another embodiment, the gaming device disclosed herein includes an expanding and roaming wild symbol that expands across a plurality of reels. That is, the wild symbol expands (e.g., left to right or right to left) and causes at least one symbol of a plurality of reels to act as a wild symbol (e.g., in the form of an expanding wild row). In one such embodiment, the expanding wild row rolls top to bottom (or bottom to top) instead of left to right (or right to left). As in other embodiments disclosed herein, one or more trigger symbols determines the number of rolls associated with each expanding wild symbol that appears on the reels.

Video Poker and Other Games

In one alternative embodiment, as illustrated in FIGS. 4A, 4B, 4C and 4D, the expanding and roaming wild symbol is employed in a card game such as a video poker game. In this embodiment, the display device of the gaming device displays a plurality of poker hands 202, 204 and 206. Each poker hand includes a plurality of cards to a player. The cards include a plurality of symbols including at least one wild symbol (e.g., at least one wild card). The symbols may be any suitable symbols such as numbers, colors, letters, playing card suits, images or any other suitable symbols or images. In this alternative embodiment, one of the cards is designated as a trigger symbol, such as the trigger symbol described above. When one of the poker hands includes the designated card (e.g., the trigger symbol) and a wild card, a bonus feature is initiated to provide the player with increased opportunities to win an award in the game.

Figure 4A:
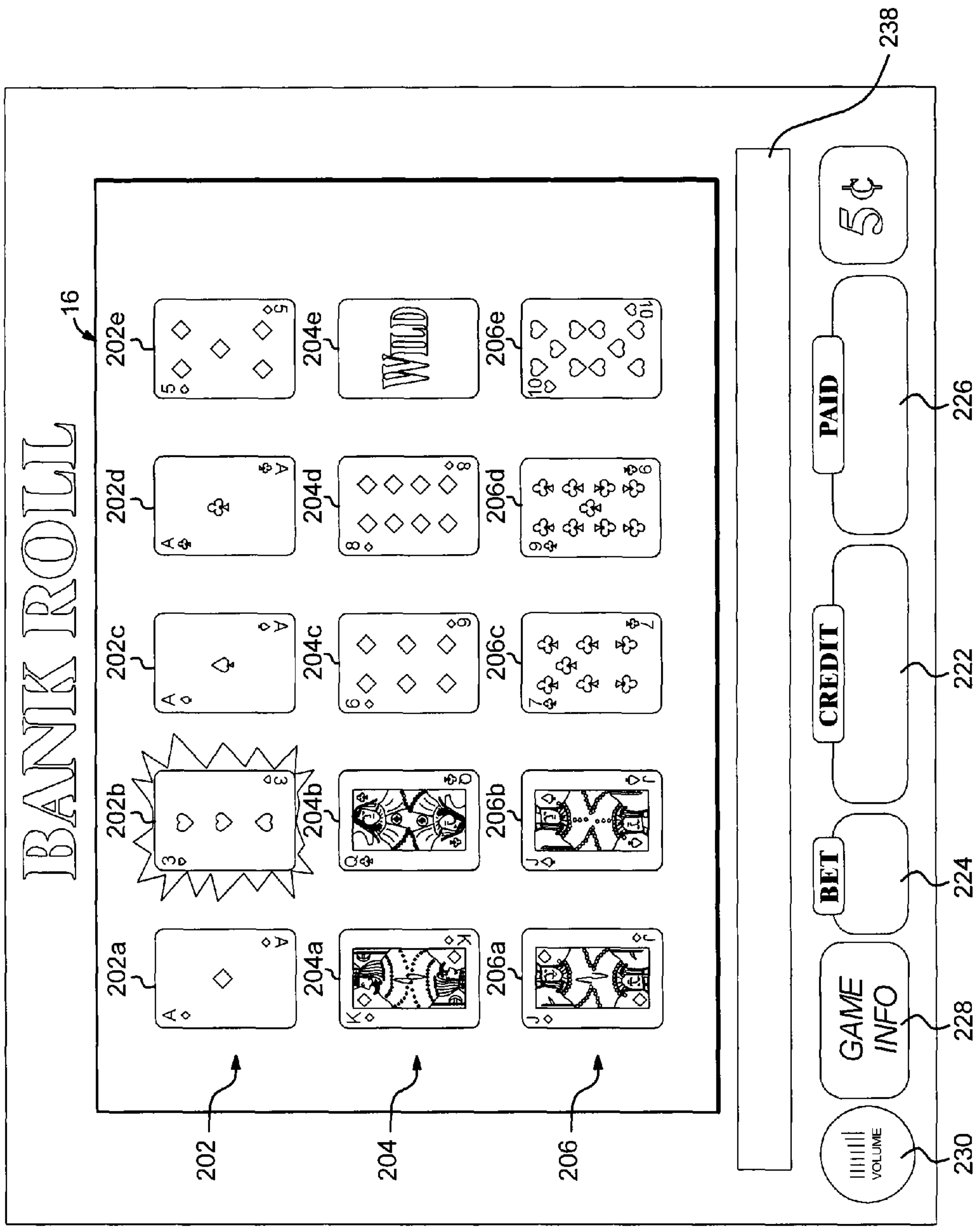
FIGS. 4A, 4B, 4C and 4D are front views of a display device of one embodiment of the gaming device, wherein the display device displays a plurality of symbols in a video poker game.

Referring to FIG. 4A, the above embodiment is illustrated where a display device of the gaming device, such as the display device 16, displays three poker hands of five cards each to the player in the game. Each poker hand is dealt from one or more decks of at least 52 playing cards. The first poker hand 202 includes an ace of diamonds (202*a*), a trigger symbol, such as a three of hearts (202*b*), an ace of spades (202*c*), an ace of clubs (202*d*) and a five of diamonds (202*e*). The three of hearts (202*b*) is designated as the trigger symbol and is highlighted to indicate the trigger symbol to the player. It should be appreciated that the trigger symbol may be indicated by any suitable indicator or symbol. The second poker hand 204 includes a king of diamonds (204*a*), a queen of clubs (204*b*), a six of diamonds (204*c*), an eight of diamonds (204*d*) and a wild card (204*e*). The third poker hand 206 includes a jack of diamonds (206*a*), a jack of spades (206*b*), a seven of clubs (206*c*), a nine of spades (206*d*) and a ten of hearts (206*e*). In this embodiment, the minimum hand value for a winning combination of cards is a pair of matching cards, such as a pair of jacks or better. Therefore, the combination of cards displayed in hands 202 and 206 produce a winning combination of cards in the game. In one embodiment, the awards associated with these winning combination of cards are added to a total award display 226 and provided to the player when the game ends. The total award display 226 indicates the total value of the awards accumulated by the player in the game. In one embodiment, an award display 238 may inform the player of the number of credits won via messaging, such as "YOU HAVE WON 50 CREDITS!" or "FOUR ACES PAY 500 CREDITS!"

As illustrated, the display device 16 may include a credit display 222, which displays the number of credits available to the player to wager or bet on the game. A bet or wager display 224 indicates the number of credits the player wagered or bet on the game. A paytable display 228 indicates, upon player request or input, information associated with a paytable of the game. Such information may include one or more awards associated with winning symbols or symbol combinations in the game. A volume display 230 indicates the volume at which sounds of the game are presented to the player. Through player input, the volume display 230 enables the player to adjust the volume at which sounds of the game are presented to the player.

As illustrated, the three of hearts (card 202*b*) is the trigger symbol. In other embodiments, any of the cards could be designated as the trigger symbol or a card with the words "Trigger Card" could be designated as the trigger symbol. Because the trigger symbol appears as one of the cards (card 202*b*) in hand 202 and a wild symbol appears as one of the cards (card 204*e*) in hand 204, a bonus feature is initiated.

Figure 4B:
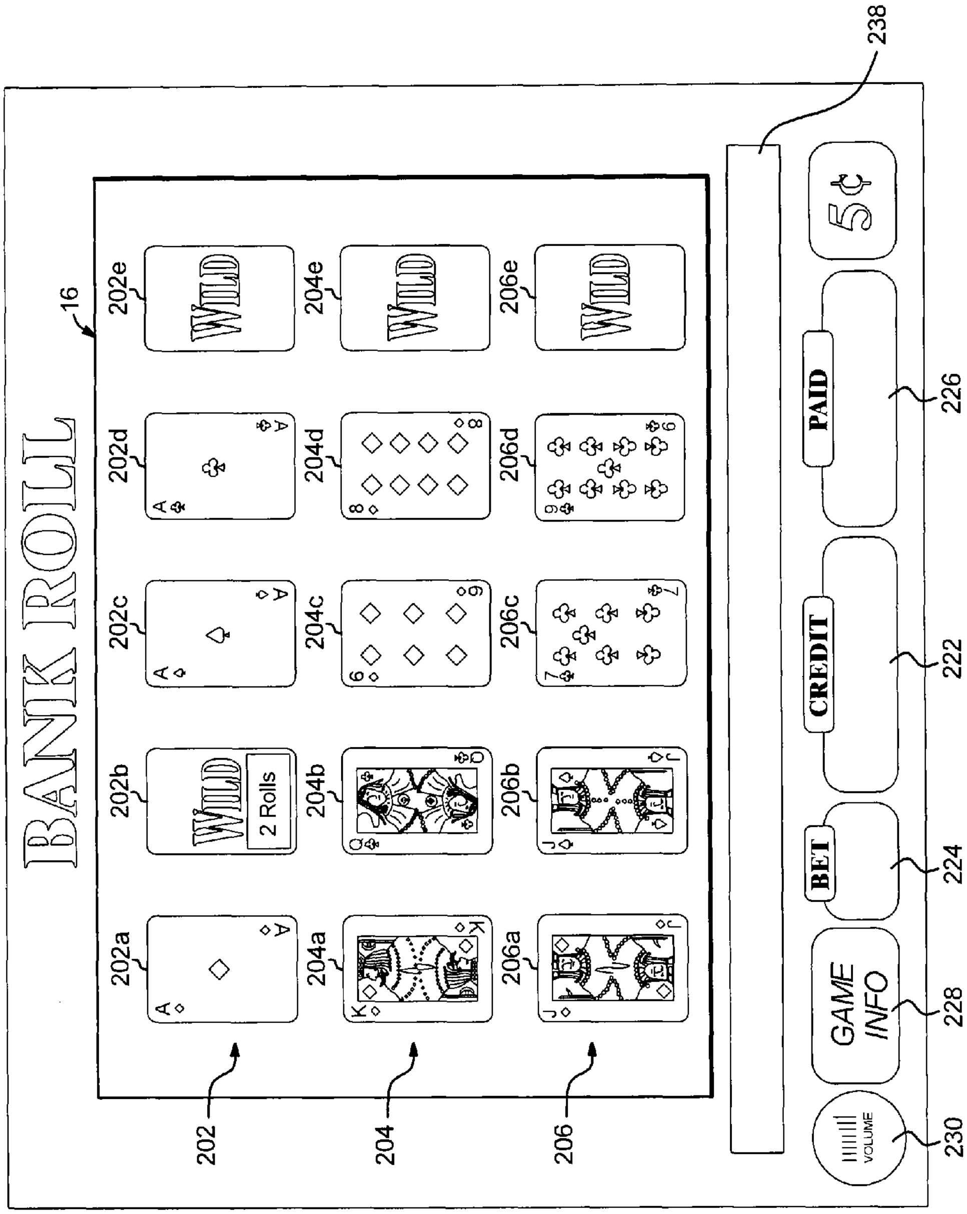

As illustrated in FIG. 4B, in the bonus feature, the gaming device processor expands each wild symbol or wild card indicated in the poker hands 202, 204 and 206. The wild card is expanded to hands 202 and 206 and overlays the five of diamonds (202*e*) of hand 202 and the ten of hearts (206*e*) of hand 206. During an initial award evaluation (not shown), the cards 202*e*, 204*e* and 206*e* in the hands 202, 204 and 206 act as wild cards. Accordingly, as illustrated in FIG. 4B, hand 202 includes a winning combination of four aces, hand 204 includes a winning combination of two kings and hand 206 includes a winning combination of three jacks. As illustrated, the trigger symbol (e.g., the three of hearts) is associated with two rolls and changes to a wild symbol during the initial award evaluation. In one embodiment, the trigger symbol changes to a wild symbol after the initial award evaluation so that the trigger symbol acts as a wild symbol in each award evaluation after the initial award evaluation.

Figure 4C:
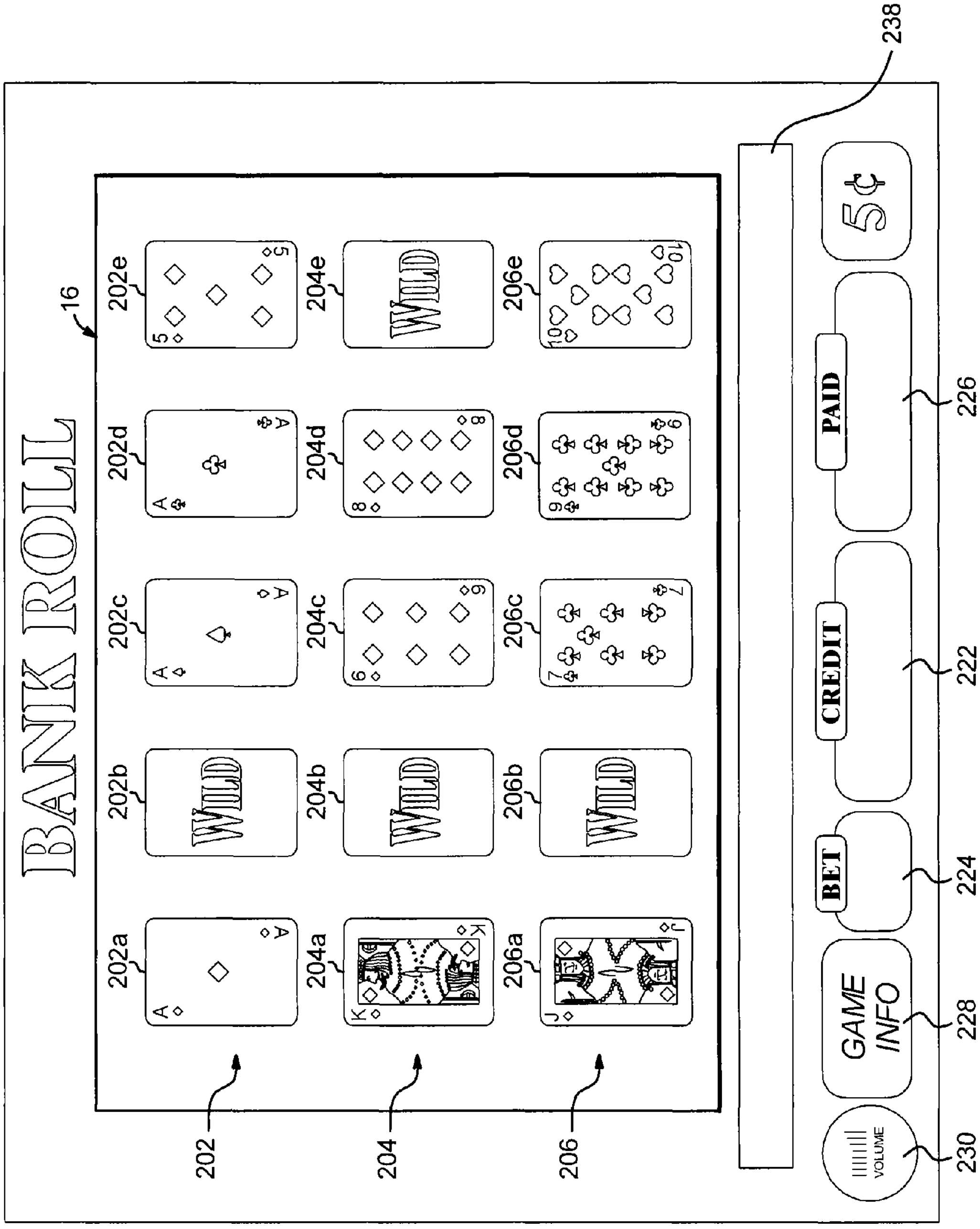

FIG. 4C illustrates the expanded wild symbols after rolling to at least one other card of the poker hands. The expanded wild symbols landed on or moved to cards 202*b*, 204*b* and 206*b* of hands 202, 204 and 206, respectively. The expanded wild symbols overlay the three of hearts (202*b*) of hand 202, the queen of clubs (204*b*) of hand 204 and the jack of spades (206*b*) of hand 206. During an award evaluation (not shown), the cards 202*b*, 204*b* and 206*b* in the hands 202, 204 and 206 act as wild cards. Accordingly, as illustrated in FIG. 4C, hand 202 includes a winning combination of four aces, hand 204 includes a winning combination of a flush and hand 206 includes a winning combination of a straight. Although not shown, a remaining rolls display may be provided to inform the player on how many rolls of the expanded wild symbols the player has remaining.

Figure 4D:
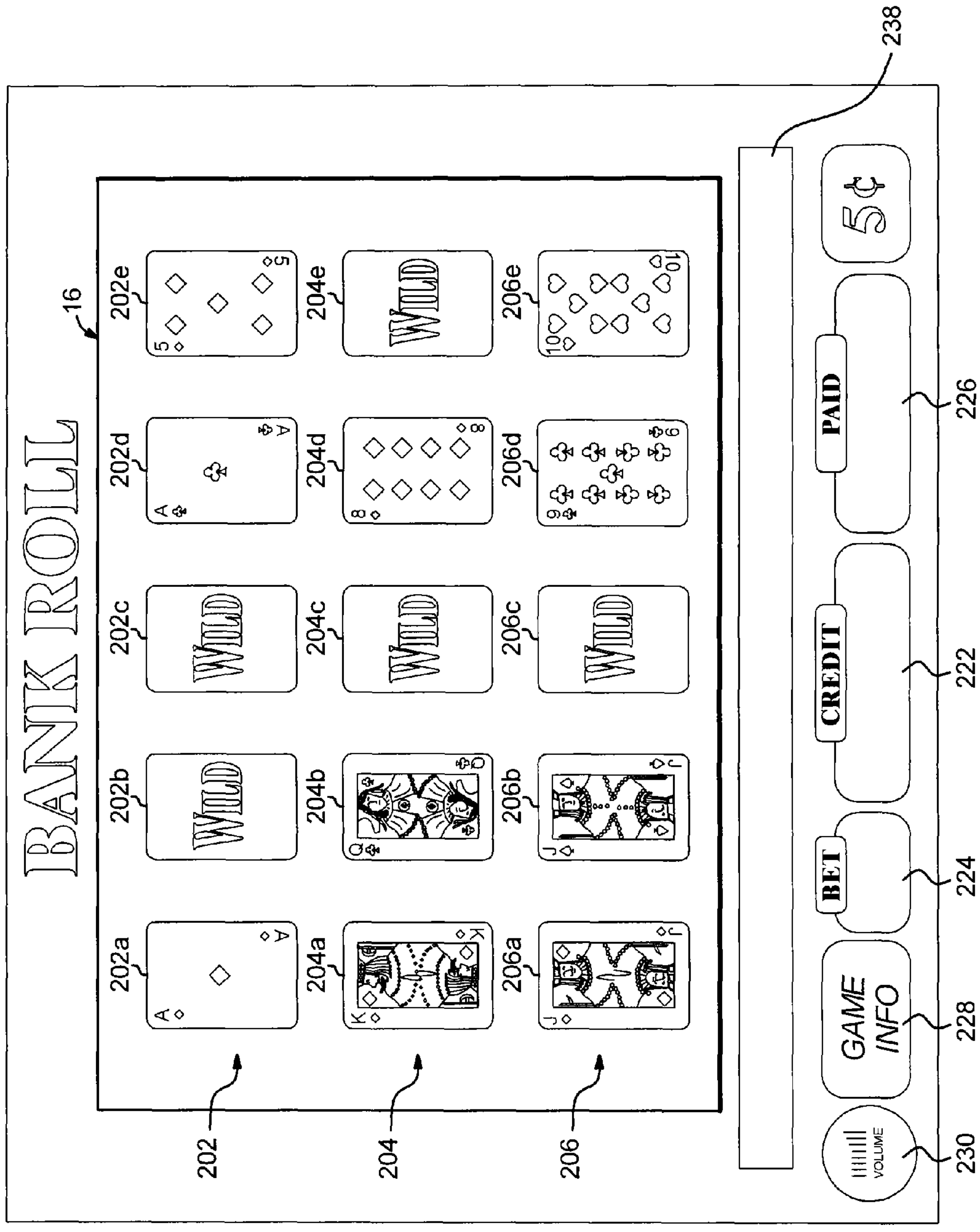

The gaming device rolls or moves these expanded wild symbols until the number of moves associated with the trigger symbol are used. After each roll, the gaming device changes the trigger symbol to a wild symbol and performs an award evaluation using the expanded wild symbols and the wild trigger symbol. As illustrated in FIG. 4D, the trigger symbol is changed to a wild symbol or card. As illustrated, the expanded wild symbols rolled to at least one other card of the poker hands. The expanded wild symbols landed on or moved to cards 202*c*, 204*c* and 206*c* of hands 202, 204 and 206, respectively. The expanded wild symbols overlay the ace of spades (202*c*) of hand 202, the six of diamonds (204*c*) of hand 204 and the seven of clubs (206*c*) of hand 206. During an award evaluation (not shown), the cards 202*c*, 204*c* and 206*c* in the hands 202, 204 and 206 act as wild cards. Additionally, the trigger symbol (i.e., the three of hearts) which is card 202*b* of hand 202 is now a wild card. Accordingly, as illustrated in FIG. 4D, hand 202 includes a winning combination of four aces, hand 204 includes a winning combination of three kings and hand 206 includes a winning combination of three jacks.

After each award evaluation, the gaming device provides the player with the award associated with the winning combination of cards in the game. Although not illustrated, the award can be indicated by the total award display 226.

It should be appreciated that the expanding and roaming wild symbol or reel may be employed in a primary game, a bonus game, a free game, a free spins game, a sub-game or in any other suitable game. That is, different wagering games, such as video poker games, video blackjack games, video keno, video bingo or any other suitable game may be implemented. Additionally, the expanding and roaming wild symbol or reel may be employed by a game that is displayed by either or both of the display devices 16 and 18 described above. In various embodiments, it should be appreciated that the expanding and roaming wild symbols disclosed herein could also be implemented in a cascading or falling symbol game as described above. Additionally, independent of how each symbol is generated or displayed, modification of the number of generated symbols (e.g., either by modifying the number of reels or modifying the number of symbols generated in the symbol positions), modifies the number of ways to win.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device, for a play of a game operable upon a wager by a player, to:

(a) display a plurality of reels associated with a plurality of symbols, each of said symbols configured to be displayed at one of a plurality of symbol positions associated with the reels, said plurality of symbols including: at least one wild symbol;

(ii) a first triggering symbol associated with a first predetermined quantity of moves, said first predetermined quantity being at least one; and (iii) a second triggering symbol associated with a second, different predetermined quantity of moves, said second predetermined quantity being at least one;

(b) generate and simultaneously display a first plurality of said symbols at said symbol positions associated with the reels; and (c) if said simultaneously displayed first plurality of symbols includes at least one of the triggering symbols and the at least one wild symbol:

(i) determine the reel on which the at least one wild symbol is displayed;

(ii) expand the displayed at least one wild symbol to one or more symbol positions associated with the determined reel to form an expanded wild symbol set;

(iii) determine if any winning symbol combinations are indicated on the reels in an initial award evaluation of said simultaneously displayed first plurality of symbols and said expanded wild symbol set;

(iv) for each of the predetermined quantity of moves associated with the displayed at least one of the triggering symbols:

(A) move the expanded wild symbol set to one of the reels; and (B) determine if any winning symbol combinations are indicated on the reels in a subsequent award evaluation of said simultaneously displayed first plurality of symbols and said expanded wild symbol set; and (v) provide any awards to the player for each winning symbol combination indicated on the reels in the initial and subsequent award evaluations.

2. The gaming device of claim 1, wherein the plurality of instructions, when executed by the at least one processor, cause the at least one processor to operate with the at least one display device to cause the expanded wild symbol set to move relative to the reels.

3. The gaming device of claim 1, wherein the plurality of instructions, when executed by the at least one processor, cause the at least one processor to operate with the at least one display device to cause the expanded wild symbol set to move sequentially across the reels.

4. The gaming device of claim 1, wherein the game plurality of symbols includes a plurality of wild symbols.

5. The gaming device of claim 4, wherein the plurality of instructions, when executed by the at least one processor, cause the at least one processor to operate with the at least one display device to, if the simultaneously displayed first plurality of symbols includes at least one of the triggering symbols and a plurality of said wild symbols, independently expand each displayed wild symbol along the reel on which the wild symbol is displayed.

6. The gaming device of claim 5, wherein the plurality of instructions, when executed by the at least one processor, cause the at least one processor to operate with the at least one display device to cause each expanded wild symbol to move to one of the reels for each move associated with said displayed at least one of the triggering symbols.

7. The gaming device of claim 5, wherein the plurality of instructions, when executed by the at least one processor, cause the at least one processor to operate with the at least one display device to cause the expanded wild symbols to move to different reels.

8. The gaming device of claim 1, wherein the plurality of instructions, when executed by the at least one processor, cause the at least one processor to operate with the at least one display device to cause the displayed at least one wild symbol to expand along the reel on which the wild symbol is displayed.

9. The gaming device of claim 1, wherein the plurality of instructions, when executed by the at least one processor, cause the at least one processor to operate with the at least one display device to cause the displayed at least one wild symbol to expand along one or more symbol positions associated with different reels.

10. The gaming device of claim 1, wherein the plurality of instructions, when executed by the at least one processor, cause the at least one processor to operate with the at least one display device to cause each wild symbol of the expanded wild symbol set to move independently to one of the symbol positions of one of the reels for each move associated with said displayed at least one of the triggering symbols.

11. The gaming device of claim 1, wherein the plurality of instructions, when executed by the at least one processor, cause the at least one processor to operate with the at least one display device to cause the expanded wild symbol set to move from a first reel to a second, different reel.

12. The gaming device of claim 1, wherein the plurality of instructions, when executed by the at least one processor, cause the at least one processor to operate with the at least one display device to cause said displayed at least one of the triggering symbols to function as an individual wild symbol.

13. The gaming device of claim 1, wherein the plurality of instructions, when executed by the at least one processor, cause the at least one processor to operate with the at least one display device to cause said displayed at least one of the triggering symbols to function as an individual wild symbol if the expanded wild symbol set moves to one of the reels for each subsequent award evaluation.

14. A gaming device comprising:

at least one display device;

at least one input device;

at least one processor; and at least one memory device which stores a plurality of instructions, which when executed by the at least one processor, cause the at least one processor to operate with the at least one display device and the at least one input device, for a play of a game operable upon a wager by a player, to:

(a) display a plurality of reels associated with a plurality of symbols, each of said symbols configured to be displayed at one of a plurality of symbol positions associated with the reels, said plurality of symbols including:

(i) at least one wild symbol;

(ii) a first triggering symbol associated with a first predetermined quantity of moves, said first predetermined quantity being at least one; and (iii) a second triggering symbol associated with a second, different predetermined quantity of moves, said second predetermined quantity being at least one;

(b) generate and simultaneously display a first plurality of said symbols at said symbol positions associated with the reels;

(c) if said simultaneously displayed first plurality of symbols includes at least one of said triggering symbols and said at least one wild symbol:

(i) cause the displayed at least one wild symbol to expand to one or more additional symbol positions associated with the reel on which the at least one wild symbol is displayed to form an expanded wild symbol set;

(ii) evaluate the simultaneously displayed first plurality of symbols and the expanded wild symbol set to determine if any winning symbol combinations are indicated on the reels;

(iii) move the expanded wild symbol set to one of the reels; and (iv) repeat (ii) and (iii) for each move associated with the displayed at least one of the triggering symbols; and (d) provide an award, if any, to the player for each winning symbol combination indicated on the reels.

15. The gaming device of claim 14, wherein the expanded wild symbol includes a plurality of individual wild symbols at different symbol positions associated with the same reel.

16. The gaming device of claim 14, wherein the expanded wild symbol includes a plurality of individual wild symbols at different symbol positions associated with different reels.

17. The gaming device of claim 14, wherein the plurality of symbols includes a plurality of wild symbols, and wherein the plurality of instructions, when executed by the at least one processor, cause the at least one processor to operate with the at least one display device, if the simultaneously displayed first plurality of symbols includes a plurality of the wild symbols, to cause each displayed wild symbol to independently expand to one or more additional symbol positions associated with one of the reels.

18. The gaming device of claim 17, wherein the plurality of instructions, when executed by the at least one processor, cause the at least one processor to operate with the at least one display device to cause each expanded wild symbol set to move to one of the reels for each move associated with the displayed at least one of the triggering symbols.

19. The gaming device of claim 17, wherein the plurality of instructions, when executed by the at least one processor, cause the at least one processor to operate with the at least one display device to cause each displayed wild symbol to expand to one or more additional symbol positions associated with the reel on which the wild symbols are displayed.

20. The gaming device of claim 14, wherein the plurality of symbols includes a plurality of wild symbols, and wherein the plurality of instructions, when executed by the at least one processor, cause the at least one processor to operate with the at least one display device, if the simultaneously displayed first plurality of symbols includes a plurality of the wild symbols, to cause each displayed wild symbol to expand to one or more additional symbol positions associated with different reels.

21. The gaming device of claim 14, wherein the plurality of symbols includes a plurality of wild symbols, and wherein the plurality of instructions, when executed by the at least one processor, cause the at least one processor to operate with the at least one display device, if the simultaneously displayed first plurality of symbols includes a plurality of the wild symbols, to cause each displayed wild symbol at each symbol position to independently move to one of the reels for each move associated with the displayed at least one of the trigger symbols.

22. The gaming device of claim 14, wherein the plurality of instructions, when executed by the at least one processor, cause the at least one processor to operate with the at least one display device to cause said displayed at least one of the triggering symbols to function as an individual wild symbol.

23. The gaming device of claim 14, wherein the plurality of instructions, when executed by the at least one processor, cause the at least one processor to operate with the at least one display device to cause said displayed at least one of the triggering symbols to function as an individual wild symbol if the expanded wild symbol set moves to one of the reels.

24. A method of operating a gaming device, said method comprising:

(a) causing at least one processor to execute a plurality of instructions stored in at least one memory device to operate with at least one display device and at least one input device to enable a player to place a wager for a play of a game said game associated with a plurality of reels, the plurality of reels being associated with a plurality of symbols, each of said symbols configured to be displayed at one of a plurality of symbol positions associated with the reels, said plurality of symbols including:
   (i) at least one wild symbol;
   (ii) a first triggering symbol associated with a first predetermined quantity of moves, said first predetermined quantity being at least one; and
   (iii) a second triggering symbol associated with a second, different predetermined quantity of moves, said second predetermined quantity being at least one; and (b) after receiving said wager, causing the at least one processor to execute the plurality of instructions to operate with the at least one display device to:
   (i) generate and simultaneously display a first plurality of the symbols at said symbol positions associated with the reels;
   (ii) if said simultaneously displayed first plurality of symbols includes at least one of said triggering symbols and said at least one wild symbol:
      (A) determine the reel on which the at least one wild symbol is displayed;
      (B) expand the displayed wild symbol to one or more symbol positions associated with the determined reel to form an expanded wild symbol set;
      (C) determine if any winning symbol combinations are displayed on the reels in an initial award evaluation of said simultaneously displayed first plurality of symbols and said expanded wild symbol set; and
      (D) for each of the predetermined quantity of moves associated with the displayed at least one of the triggering symbols:
         (1) move the expanded wild symbol set to one of the reels; and
         (2) determine if any winning symbol combinations are displayed on the reels in a subsequent award evaluation of said simultaneously displayed first plurality of symbols and said expanded wild symbol set; and
   (iii) cause any awards to be provided to the player for each winning symbol combination that was displayed on the reels in the initial and subsequent award evaluations.

25. The method of claim 24, which includes causing the at least one processor to execute the plurality of instructions to operate with the at least one display device to move the expanded wild symbol set relative to the reels.

26. The method of claim 24, which includes causing the at least one processor to execute the plurality of instructions to operate with the at least one display device to move the expanded wild symbol set sequentially across the reels.

27. The method of claim 24, wherein the plurality of symbols includes a plurality of wild symbols.

28. The method of claim 27, which includes, when the displayed first plurality of symbols includes one of the triggering symbols and a plurality of the wild symbols, causing the at least one processor to execute the plurality of instructions to operate with the at least one display device to independently expand each displayed wild symbol along the reel which displayed the wild symbol.

29. The method of claim 28, which includes causing the at least one processor to execute the plurality of instructions to operate with the at least one display device to move each expanded wild symbol to one of the reels for each move associated with said displayed at least one of the triggering symbols.

30. The method of claim 28, which includes causing the at least one processor to execute the plurality of instructions to operate with the at least one display device to move the displayed plurality of wild symbols to different reels.

31. The method of claim 24, which includes causing the at least one processor to execute the plurality of instructions to operate with the at least one display device to expand the displayed at least one wild symbol along different reels.

32. The method of claim 24, which includes causing the at least one processor to execute the plurality of instructions to operate with the at least one display device to independently move each wild symbol of the expanded wild symbol set to one of the reels for each move associated with said displayed at least one of the triggering symbols.

33. The method of claim 24, which includes causing the at least one processor to execute the plurality of instructions to operate with the at least one display device to move the expanded wild symbol set from a first reel to a second, different reel.

34. The method of claim 24, which includes causing the at least one processor to execute the plurality of instructions to cause said displayed at least one of the triggering symbols to function as an individual wild symbol.

35. The method of claim 24, which includes causing the at least one processor to execute the plurality of instructions to operate with the at least one display device to cause said displayed at least one of the triggering symbols to function as an individual wild symbol after moving the expanded wild symbol set to one of the reels for each subsequent award evaluation.

36. The method of claim 24, which is provided through a data network.

37. The method of claim 36, wherein the data network is an internet.

38. A method of operating a gaming device, said method comprising:

(a) causing at least one processor to execute a plurality of instructions stored in at least one memory device to operate with at least one display device and at least one input device to enable a player to place a wager for a play of a game, said game associated with a plurality of reels, said plurality of reels being associated with a plurality of symbols, each of said symbols configured to be displayed at one, of a plurality of symbol positions associated with the reels, said plurality of symbols including:
(i) at least one wild symbol;
(ii) a first triggering symbol associated with a first predetermined quantity of moves, said first predetermined quantity being at least one; and
(iii) a second triggering symbol associated with a second, different predetermined quantity of moves, said second predetermined quantity being at least one; and (b) after receiving said wager, causing the at least one processor to execute the plurality of instructions to operate with the at least one display device to:
(i) generate and simultaneously display a first plurality of the symbols at said symbol positions associated with the reels; and
(ii) if said simultaneously displayed first plurality of symbols includes at least one of said triggering symbols and said at least one wild symbol:
(A) expand the displayed at least one wild symbol to one or more additional symbol positions associated with the reel on which the at least one wild symbol is displayed to form an expanded wild symbol set;
(B) evaluate the simultaneously displayed first plurality of symbols and the expanded wild symbol set to determine if any winning symbol combinations are indicated on the reels;
(C) move the expanded wild symbol set to one of the reels; and
(D) repeat (B) and (C) for each move associated with the displayed at least one of the triggering symbols; and
(iii) cause an award, if any, to be provided to the player for each winning symbol combination that is indicated on the reels.

39. The method of claim 38, which includes causing the at least one processor to execute the plurality of instructions to operate with the at least one display device to display a plurality of wild symbols at different symbol positions associated with the same reel.

40. The method of claim 38, which includes causing the at least one processor to execute the plurality of instructions to operate with the at least one display device to display a plurality of wild symbols at different symbol positions associated with different reels.

41. The method of claim 38, wherein the plurality of symbols includes a plurality of wild symbols, and wherein if the displayed first plurality of symbols includes a plurality of the wild symbols, the method includes causing the at least one processor to execute the plurality of instructions to operate with the at least one display device to independently expand each displayed wild symbol along one of the reels and move the expanded wild symbol to one of the reels for each move associated with said displayed at least one of the triggering symbols.

42. The method of claim 38, wherein the plurality of symbols includes a plurality of wild symbols, and wherein if the simultaneously displayed first plurality of symbols includes a plurality of the wild symbols, the method includes causing the at least one processor to execute the plurality of instructions to operate with the at least one display device to expand each displayed wild symbol and independently move the plurality of expanded wild symbols to different reels for each move associated with said displayed at least one of the triggering symbols.

43. The method of claim 38, which includes causing the at least one processor to execute the plurality of instructions to operate with the at least one display device to expand the displayed wild symbol to one or more additional symbol positions associated with different reels.

44. The method of claim 38, which includes causing the at least one processor to execute the plurality of instructions to operate with the at least one display device to independently move each wild symbol of the expanded wild symbol set to one of the reels for each move associated with the triggering symbol.

45. The method of claim 38, which includes causing the at least one processor to execute the plurality of instructions to operate with the at least one display device to cause said displayed at least one of the triggering symbols to function as an individual wild symbol.

46. The method of claim 38, which includes causing the at least one processor to execute the plurality of instructions to operate with the at least one display device to cause said displayed at least one of the triggering symbols to function as an individual wild symbol after moving the expanded wild symbol set to one of the reels.

47. The method of claim 38, which is provided through a data network.

48. The method of claim 47, wherein the data network is an internet.

* * * * *

UNITED STATES PATENT AND TRADEMARK OFFICE

CERTIFICATE OF CORRECTION

PATENT NO. : 8,137,179 B2
APPLICATION NO. : 11/557865
DATED : March 20, 2012
INVENTOR(S) : Janna B. Jensen et al.

It is certified that error appears in the above--identified patent and that said Letters Patent is hereby corrected as shown below:

IN THE CLAIMS

In Claim 1, Column 30, Line 19, before “at” insert --(i)--.
In Claim 1, Column 30, Lines 29 to 30, between “of” and “symbols” insert --said--.
In Claim 1, Column 30, Lines 39 to 40, between “of” and “symbols” insert --said--.
In Claim 1, Column 30, Line 49, between “of” and “symbols” insert --said--.
In Claim 4, Column 30, Line 64, delete “game.”.
In Claim 5, Column 31, Line 3, between “of” and “symbols” insert --said--.
In Claim 8, Column 31, Line 23, between “the” and “wild” insert --at least one--.
In Claim 14, Column 32, Lines 15 to 16, between “of” and “symbols” insert --said--.
In Claim 14, Column 32, Line 25, between “of” and “symbols” insert --said--.
In Claim 15, Column 32, Line 37, replace “the” with --a--.
In Claim 17, Column 32, Line 46, between “of” and “symbols” insert --said--.
In Claim 20, Column 32, Line 67, between “of” and “symbols” insert --said--.
In Claim 21, Column 33, Line 9, between “of” and “symbols” insert --said--.
In Claim 21, Column 33, Line 12, replace “trigger” with --triggering--.
In Claim 24, Column 33, Line 32, after “a game” insert --,--.
In Claim 24, Column 33, Line 51, before “symbols” insert --the--.
In Claim 24, Column 33, Line 55, between “displayed” and “wild” insert --at least one--.
In Claim 24, Column 33, Line 61, between “of” and “symbols” insert --the--.
In Claim 24, Column 34, Line 4, between “of” and “symbols” insert --the--.
In Claim 28, Column 34, Line 22, between “of” and “symbols” insert --the--.
In Claim 38, Column 35, Line 10, delete the “,” following “one.”.
In Claim 38, Column 35, Line 26, before “symbols” insert --the--.
In Claim 38, Column 35, Line 33, between “of” and “symbols” insert --the--.
In Claim 39, Column 35, Line 48, replace “the” with --a--.
In Claim 41, Column 36, Line 6, between “of” and “symbols” insert --the--.
In Claim 42, Column 36, Line 16, between “of” and “symbols” insert --the--.

Signed and Sealed this
Tenth Day of July, 2012

David J. Kappos

David J. Kappos
*Director of the United States Patent and Trademark Office*

IN THE CLAIMS

In Claim 43, Column 36, Line 27, between “displayed” and “wild” insert --at least one--.
In Claim 44, Column 36, Line 33, between “the” and “triggering” insert --displayed at least one of the--.
In Claim 44, Column 36, Line 34, replace “symbol” with --symbols--.